(12) United States Patent
Girardin et al.

(10) Patent No.: US 12,440,399 B2
(45) Date of Patent: Oct. 14, 2025

(54) INTEGRATED WHEELCHAIR TIE-DOWN SYSTEMS FOR A WHEELCHAIR VAN OR SIMILAR VEHICLE

(71) Applicant: Valeda Company, LLC, Oakland Park, FL (US)

(72) Inventors: Patrick Girardin, Fort Lauderdale, FL (US); Daniel Tallitsch, Western Springs, IL (US); William Ott, Fort Lauderdale, FL (US)

(73) Assignee: Valeda Company, LLC, Oakland Park, FL (US)

( * ) Notice: Subject to any disclaimer, the term of this patent is extended or adjusted under 35 U.S.C. 154(b) by 499 days.

(21) Appl. No.: 17/864,852

(22) Filed: Jul. 14, 2022

(65) Prior Publication Data

US 2022/0347025 A1    Nov. 3, 2022

Related U.S. Application Data

(63) Continuation of application No. PCT/US2021/013450, filed on Jan. 14, 2021.

(60) Provisional application No. 62/961,466, filed on Jan. 15, 2020.

(51) Int. Cl.
*A61G 3/08* (2006.01)
*B62D 25/20* (2006.01)

(52) U.S. Cl.
CPC ....... *A61G 3/0808* (2013.01); *B62D 25/2036* (2013.01)

(58) Field of Classification Search
CPC ............................... A61G 3/08; A61G 3/0808
USPC ...................................... 296/19, 20
See application file for complete search history.

(56) References Cited

U.S. PATENT DOCUMENTS

| | | | |
|---|---|---|---|
| 4,847,972 A * | 7/1989 | Anderson | A61G 3/066 296/25 |
| 5,137,413 A * | 8/1992 | Ressler | B60P 1/43 280/43.11 |
| 7,455,490 B1 * | 11/2008 | Goosen | A61G 3/0808 410/7 |
| 9,333,129 B2 * | 5/2016 | Cardona | B60P 7/0823 |
| 9,597,240 B2 * | 3/2017 | Hermanson | B60P 1/435 |
| 10,292,879 B2 * | 5/2019 | Girardin | B60P 3/079 |

(Continued)

FOREIGN PATENT DOCUMENTS

| | | |
|---|---|---|
| EP | 1701860 A1 | 9/2006 |
| WO | 2014185962 A2 | 11/2014 |

OTHER PUBLICATIONS

International Searching Authority (European Patent Office), International Search Report and Written Opinion, May 7, 2021 (17 pages).

*Primary Examiner* — Gregory A Blankenship
(74) *Attorney, Agent, or Firm* — Daniel Tallitsch; Tyler Schultz

(57) ABSTRACT

Systems for securing wheelchairs in a wheelchair-accessible van or similar personal or commercial vehicle. The wheelchair securement system may be integrated into a constructed vehicle or a new floor frame for a converted wheelchair-accessible vehicle prior to the frame being secured to the vehicle body. The wheelchair securement system may be integrated in a way that does not obstruct the wheelchair from maneuvering into the vehicle via the vehicle ramp and within the vehicle as it is positioned into one or more wheelchair securement areas.

20 Claims, 18 Drawing Sheets

(56) References Cited

U.S. PATENT DOCUMENTS

| | | | | |
|---|---|---|---|---|
| 11,191,681 | B2* | 12/2021 | Cardona | B66F 7/243 |
| 2012/0294699 | A1* | 11/2012 | Sandoz | A61G 3/0808 |
| | | | | 414/539 |
| 2014/0123411 | A1* | 5/2014 | Mosey | A61G 3/0808 |
| | | | | 14/71.3 |
| 2016/0016498 | A1* | 1/2016 | Hammarskjold | B60P 7/0823 |
| | | | | 410/7 |
| 2017/0231844 | A1* | 8/2017 | Gale | A61G 3/0808 |
| | | | | 410/7 |
| 2019/0133852 | A1 | 5/2019 | Ghannam et al. | |
| 2019/0247248 | A1* | 8/2019 | Perkins | B60P 1/431 |
| 2019/0262198 | A1* | 8/2019 | Girardin | B60R 22/20 |
| 2022/0047437 | A1* | 2/2022 | Bartos | A61G 3/0808 |
| 2022/0096289 | A1* | 3/2022 | Jaradi | B60R 16/0207 |
| 2022/0347025 | A1* | 11/2022 | Girardin | A61G 3/061 |
| 2023/0240918 | A1* | 8/2023 | Giesa | B64D 11/00 |
| | | | | 244/118.6 |
| 2023/0372168 | A1* | 11/2023 | Svec | B62D 65/00 |
| 2024/0033144 | A1* | 2/2024 | Bruns | A61G 3/0808 |

* cited by examiner

INTEGRATED WHEELCHAIR TIE-DOWN SYSTEMS FOR A WHEELCHAIR VAN OR SIMILAR VEHICLE

CROSS-REFERENCE TO OTHER APPLICATIONS

This application is a continuation of PCT Application No. PCT/US2021/013450, filed on Jan. 14, 2021, which claims priority to U.S. Provisional Patent Application No. 62/961,466, filed on Jan. 15, 2020, both of which are incorporated herein by reference. In addition, U.S. Pat. No. 9,107,786, issued on Aug. 12, 2015, and U.S. Pat. No. 10,285,879, issued on May 14, 2019, are incorporated herein by reference.

BACKGROUND

Technical Field

The embodiments described and claimed herein relate generally to systems for securing wheelchairs in a wheelchair-accessible van or similar personal or commercial vehicle. In some embodiments, the wheelchair securement system is integrated into the floor frame for a converted wheelchair-accessible vehicle prior to the frame being secured to the vehicle body. In other embodiments, the wheelchair securement system is installed after conversion of the vehicle or into a vehicle that does not require a new floor frame.

Background Art

Many different vehicles can be modified for wheelchair accessibility. Most vehicles can be fitted with mobility equipment that allow a passenger with disabilities to drive a vehicle and/or access a vehicle OEM seat for transit. The nature of some persons' medical conditions, however, require the passenger to be transported while seated in their wheelchair. The term "wheelchair" is broadly used herein to refer to any wheeled mobility device, including but not limited to motorized and non-motorized wheelchairs, motorized scooters and similar devices. For true wheelchair access, a large vehicle is necessary so that the wheelchair passenger, while seated in the wheelchair, is able to enter the vehicle using a ramp or lift and to remain seated in the wheelchair during transit. Pick-up trucks and SUVs can be modified to permit such wheelchair accessibility. However, the interior space in such vehicles can be extremely limited. In that respect, minivans and full-size vans have proven to be a more popular option for conversion because their large interior space provides more flexible placement and securement of a wheelchair (or even multiple wheelchairs), and because they come with the convenience of automatic sliding doors for entry and exit.

Because full-size vans are difficult to maneuver and more expensive, minivans are particularly popular options to be modified for wheelchair accessibility. To modify a minivan, a vehicle converter will typically fully or partially strip the interior of the vehicle, including but not limited to removing seats, pulling out carpet, and removing interior paneling. The entire undercarriage (referred to herein alternatively as floor frame or framework) behind the engine compartment is then reconfigured to make room for a new, lower floor. For example, the vehicle exhaust system, fuel tank, and at least the rear suspension are removed. For a side-entry vehicle, most or all of the floor behind the engine compartment is cut out. For a rear entry vehicle, the rear center portion of the floor is cut out. At this point, a new floor framework is inserted to replace the original floor. The new floor frame includes sloped side structures on one or more or all sides of the floor to drop the level of the floor, usually between roughly 10-15 inches. The term "sloped" is used broadly herein to refer to a structure, e.g., a wall or pillar, that extends from the new floor surface at an angle greater than 0°, inclusive of 90°, relative to the floor, to lower the new floor relative to the OEM floor. Where possible, the original OEM parts are then reinstalled or modified to accommodate the dropped floor. In many cases, the OEM parts are reused or recycled and new components designed to accommodate the new floor are used. After the new floor frame is welded in place, the suspension, fuel tank, exhaust system, and other components are reinstalled. New carpeting or durable floor surfaces are then installed. Side-entry or rear-entry ramps may be installed. In some cases, the ramp is designed to be secured to the new floor frame and folds up to a storage position above the floor surface. In other cases, the floor frame is designed to receive the ramp in a storage pocket below the floor surface; in other words, the ramp slides in and out of a slot positioned between the upper and lower surfaces of the floor frame. L-tracks or other similar connectors (e.g., Q'Straint's slide and click male connector or QLK product) may then be mounted to the new floor frame, which are designed to mate with corresponding L-track fittings (such as Q'Straint's PLI L-track fitting) or other similar connectors (e.g., Q'Straint's slide and click female connector or QLK pin) that hold wheelchair tie-downs (which may include manual belts or retractors, including but not limited to Q'Straint's QRT line of retractors).

Typically, L-track or other types connectors are laid out in the vehicle to accommodate multiple wheelchair securement locations (or areas), including but not limited to the driver position, front passenger position, mid-vehicle ($2^{nd}$ row), or in the rear of the vehicle ($3^{rd}$ row). For example, in a side-entry vehicle 100, various sections of L-track 110, 112, 114, 116, 118 could be mounted to the floor frame to accommodate securement of a wheelchair in the front-passenger location 120 (as schematically shown in FIG. 1) or a mid-vehicle location 122 (as schematically shown in FIG. 2). To load and secure a wheelchair in the front-passenger wheelchair securement area 120, front retractors 130, 132 would be secured in L-tracks 110, 112 using L-track fittings 140, 142. The wheelchair passenger would then enter the vehicle 100 using side-entry ramp 102 and position him- or herself in the front-passenger wheelchair securement area 120. After the loading process is complete, rear retractors 134, 136 would be secured in L-track 114 using L-track fittings 144, 146. Another passenger in the vehicle would then typically pull on the hooks of the retractors 130, 132, 134, 136 to withdraw the retractor restraints and connect the hooks to the wheelchair at appropriate locations. The OEM or aftermarket shoulder and lap belt will then be applied to secure the person seated in the wheelchair. In many cases, the OEM lap and shoulder belt attached to the B-pillar will be used for the front-passenger wheelchair securement area (and the belt attached to the C-pillar for the mid-vehicle wheelchair securement area) in combination with an aftermarket belt with a corresponding buckle that is secured to L-track 114 or 116 via an L-track fitting (or to L-track 118 when the wheelchair is secured in the mid-vehicle wheelchair securement area). To disembark, the occupant belts will be removed from the passenger and tie-downs would be disconnected from the wheelchair. Additionally, the rear retractors 134, 136 and their L-track fittings 144, 146 will need to be removed from the L-track 114 so that the wheelchair can back out of the front-passenger wheelchair securement area 120 and leave the vehicle 100 via ramp 102. In the event that the wheelchair passenger wishes to be secured in a different location, all of the retractors 130, 132, 134, 136 and L-track fittings 140, 142, 144, 146 will need to be disengaged from L-tracks 110, 112, 114 and moved to the designated L-track fittings for the new location, such as L-track fittings 116, 118 for the mid-vehicle wheelchair securement area 122 shown in FIG. 2.

As another example, in a rear-entry vehicle 200, various sections of L-track 210 and/or slide and click male connectors 212, 214 could be mounted to the floor frame to accommodate securement of a wheelchair in the rear passenger location 220 (as schematically shown in FIG. 3). To load and secure a wheelchair in the rear wheelchair securement area 220, front retractors 230, 232 would be secured in L-track 210 using L-track fittings 240, 242. With the wheelchair passenger positioned at the bottom of the ramp 202, another passenger in the vehicle would pull on the hooks of the retractors 130, 132 to withdraw the retractor restraints and connect the hooks to the front of the wheelchair at appropriate locations. The wheelchair passenger would then be pushed up the rear-entry ramp 202 and positioned in the rear wheelchair securement area 220. After the loading process is complete, rear retractors 234, 236 would be secured to the slide and click male connectors 212, 214 using slide and click female connectors 244, 246. The hooks of the retractors 134, 136 would then be secured to the rear of the wheelchair at appropriate locations. The OEM or aftermarket shoulder and lap belt will then be applied to secure the person seated in the wheelchair. Many times, an aftermarket retractable (or length adjustable) and height-adjustable shoulder belt assembly will be installed above the intended shoulder location (to the ceiling or vehicle wall) that connects via a pin connector to a lap belt and buckle belt that are secured via pin connectors to retractors 134, 136. To disembark, the occupant belts will be removed from the passenger and tie-downs would be disconnected from the wheelchair. Additionally, the rear retractors 234, 236 and their slide and click female connectors 244, 246 will need to be removed so that the wheelchair can back out of the rear wheelchair securement area 220 and leave the vehicle 200 via ramp 202.

These prior art systems require the retractors to be repeatedly connected and detached from the vehicle to permit the wheelchair passenger to maneuver in the vehicle and to enter and disembark from the vehicle. The restraints must also be moved to different locations in the vehicle when the wheelchair passenger wishes to be secured in a different wheelchair securement area.

SUMMARY OF THE PRESENT EMBODIMENTS

Clearly, the prior art devices have limitations which the present embodiments overcome. For instance, there is a need for wheelchair tie-down systems that provide extra space for the wheelchair passenger to maneuver and be secured in the vehicle and do not obstruct the wheelchair passenger from entering and disembarking the vehicle, and therefore do not need to be removed and/or moved. The embodiments disclosed in the present application solve these and other limitations of the prior art.

In one embodiment, one or both of the front retractors for the front wheelchair passenger area may be permanently secured behind the sloped foot rest area in the front passenger area, whereby the retractor restraints extend through openings in the sloped foot rest area of the front passenger area. In some embodiments, one or both of the front retractors may be secured to the new floor frame prior to the new floor frame being welded to the vehicle body. In some embodiments, each front retractor may each be provided in a separate housing for attachment to the new floor frame, or both can be provided in the same housing.

In another embodiment, any one or more the retractors in the vehicle may be entirely or mostly recessed beneath the vehicle floor. In one embodiment, the recessed retractor is provided in a housing with a top surface that is flush or nearly flush with the new floor surface. The top surface of the housing may include pockets for receiving the retractor hook, so that the retractor hook is also flush or nearly flush with the new floor surface. The pocket may engage with the hook by friction or through a interference fit (e.g., a latch). The term "nearly flush" is used broadly to refer to the top surface of the retractor housing being located at a height above the floor surface whereby it does not preclude a wheelchair wheel from rolling over it.

In yet another embodiment, a pivoting and/or telescoping arm may be provided that extends from one or more of the vehicle side-door, B-pillar, C-pillar, D-pillar, or the sides of a rear wheelchair pan. Pockets may be provided in the panels of the previously mentioned components that receive the pivoting arms, so that they may be stored out of the way in a flush or nearly-flush manner with the respective paneling. One or more retractors may be secured directly to the arm, whereby the arm, when deployed, places the retractors in the necessary position for securing a wheelchair. Alternatively, the retractors may be secured to the side-door, B-pillar, C-pillar, D-pillar, wheelchair pan, or nearby those locations, separate from the arm. In such a case, the retractor restraints would pass on or through the arm to guides that place the retractor restraints in the necessary position for securing a wheelchair. The end of the arm opposite its pivot point or connection to the vehicle may include a connector that attaches to a corresponding connector on the vehicle floor, to improve its structural rigidity.

In yet another embodiment, one or more of the rear retractors for the mid-vehicle wheelchair securement area may be secured below the third row seat and behind the rear seat panel extending from the vehicle floor to the underside of the seat bottom. The retractor restraints may extend through openings in the rear seat panel. In some embodiments, one or both of the rear retractors may be secured to the new floor frame prior to the new floor frame being welded to the vehicle body. In some embodiments, each rear retractor may each be provided in a separate housing for attachment to the new floor frame, or both can be provided in the same housing.

In yet another embodiment, the front retractors for the rear wheelchair securement area may be recessed in the floor as described above. These retractors are ideally located laterally adjacent to the vehicle B-pillar, in front of the side-entry ramp, which may be retractable under the floor surface. In addition, rather than providing a separate set of rear retractors for the front wheelchair securement area, a pair of guides may be substituted for those rear retractors that receive the restraints of recessed retractors and directs them to the front wheelchair securement area. The guides may be pivotable, whereby they may be stored flush or near flush with the vehicle floor surface.

Other embodiments may include any combination of the embodiments described above and below.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

Figure 1:
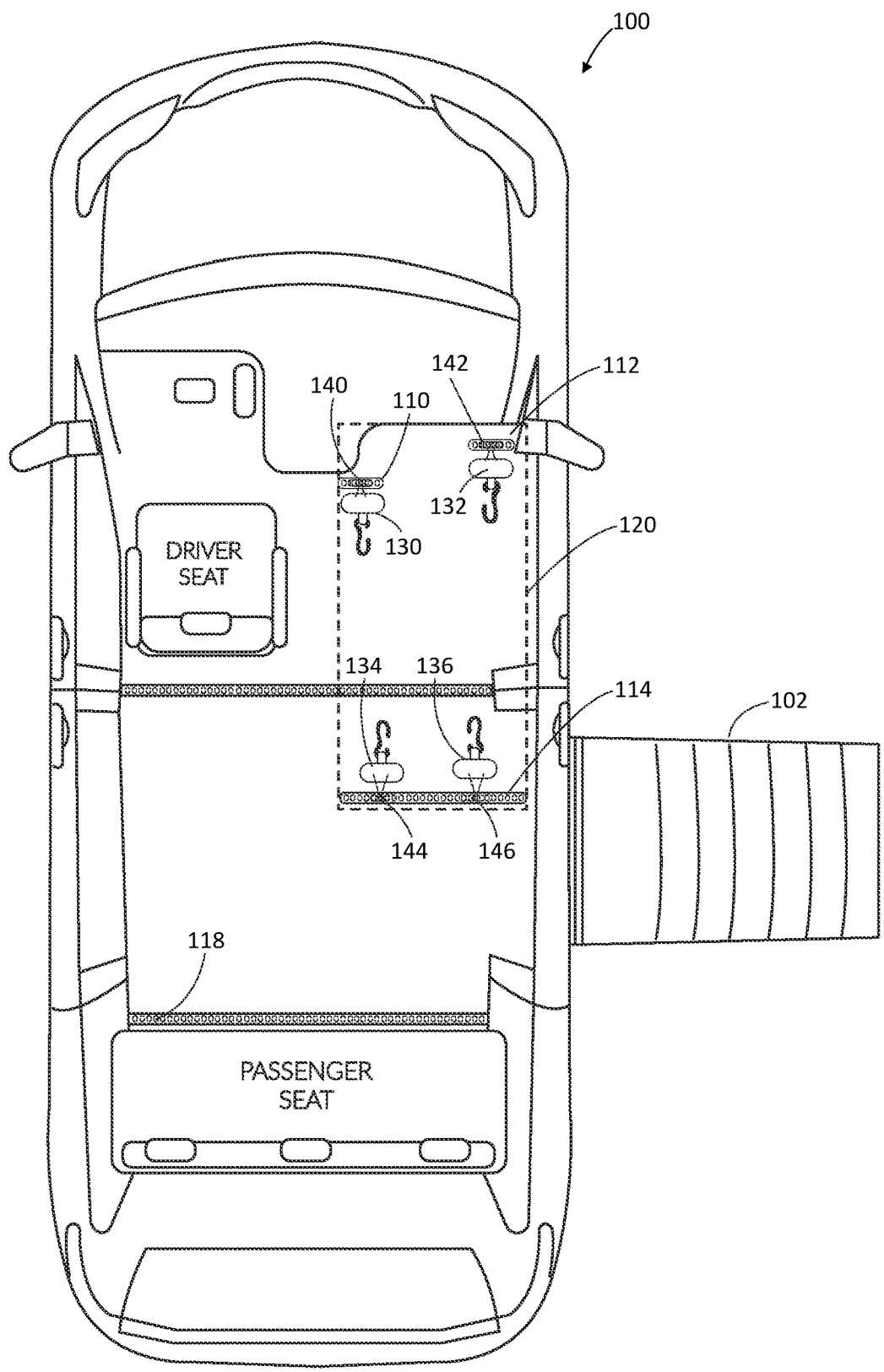
FIG. 1 is a schematic plan view of a prior art side-entry wheelchair accessible van configured to secure a wheelchair in the front passenger wheelchair securement area.
Figure 2:
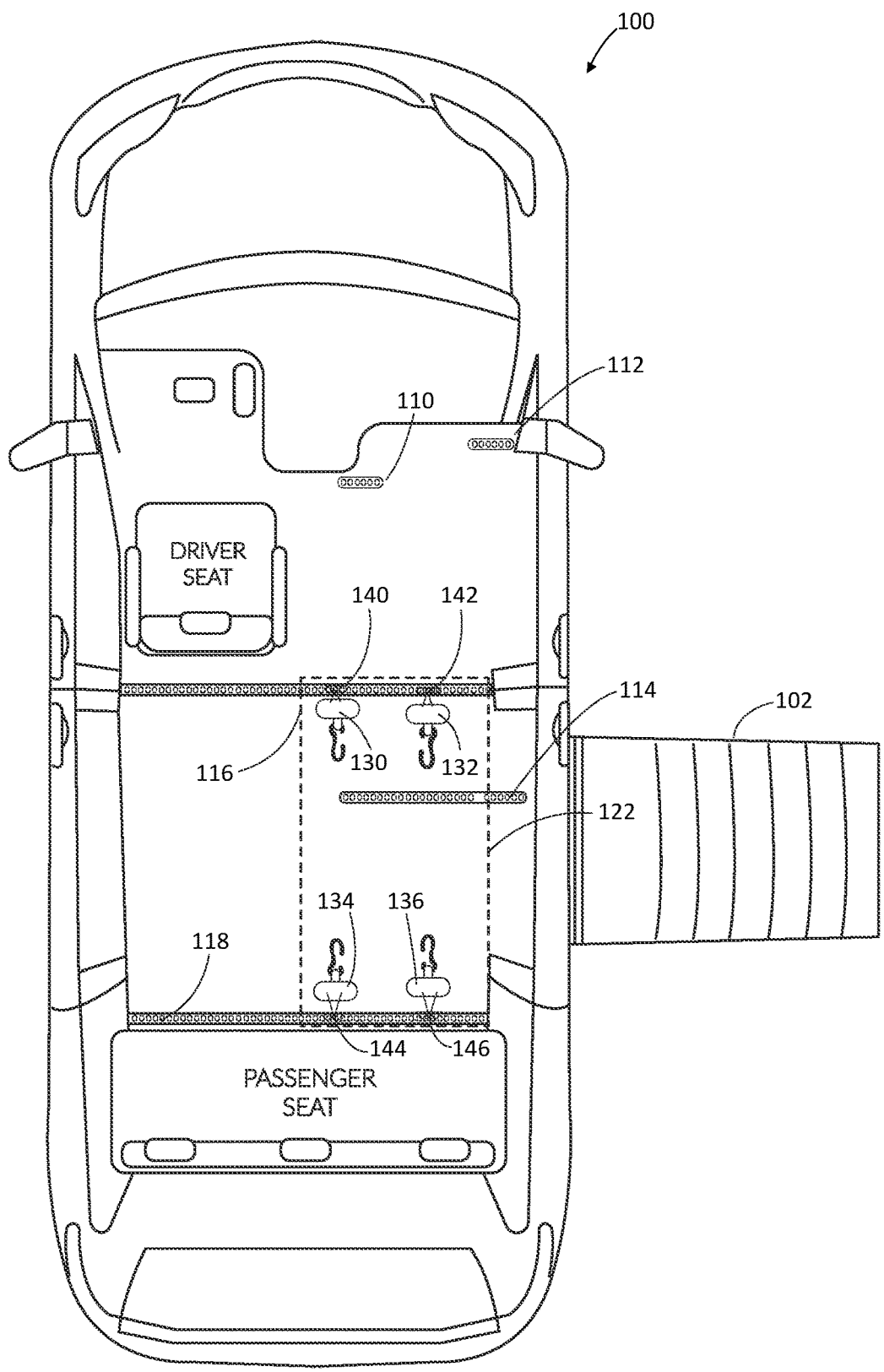
FIG. 2 is a schematic plan view of the prior art side-entry wheelchair accessible van configured to secure a wheelchair in the mid-vehicle wheelchair securement area.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

Figure 4:
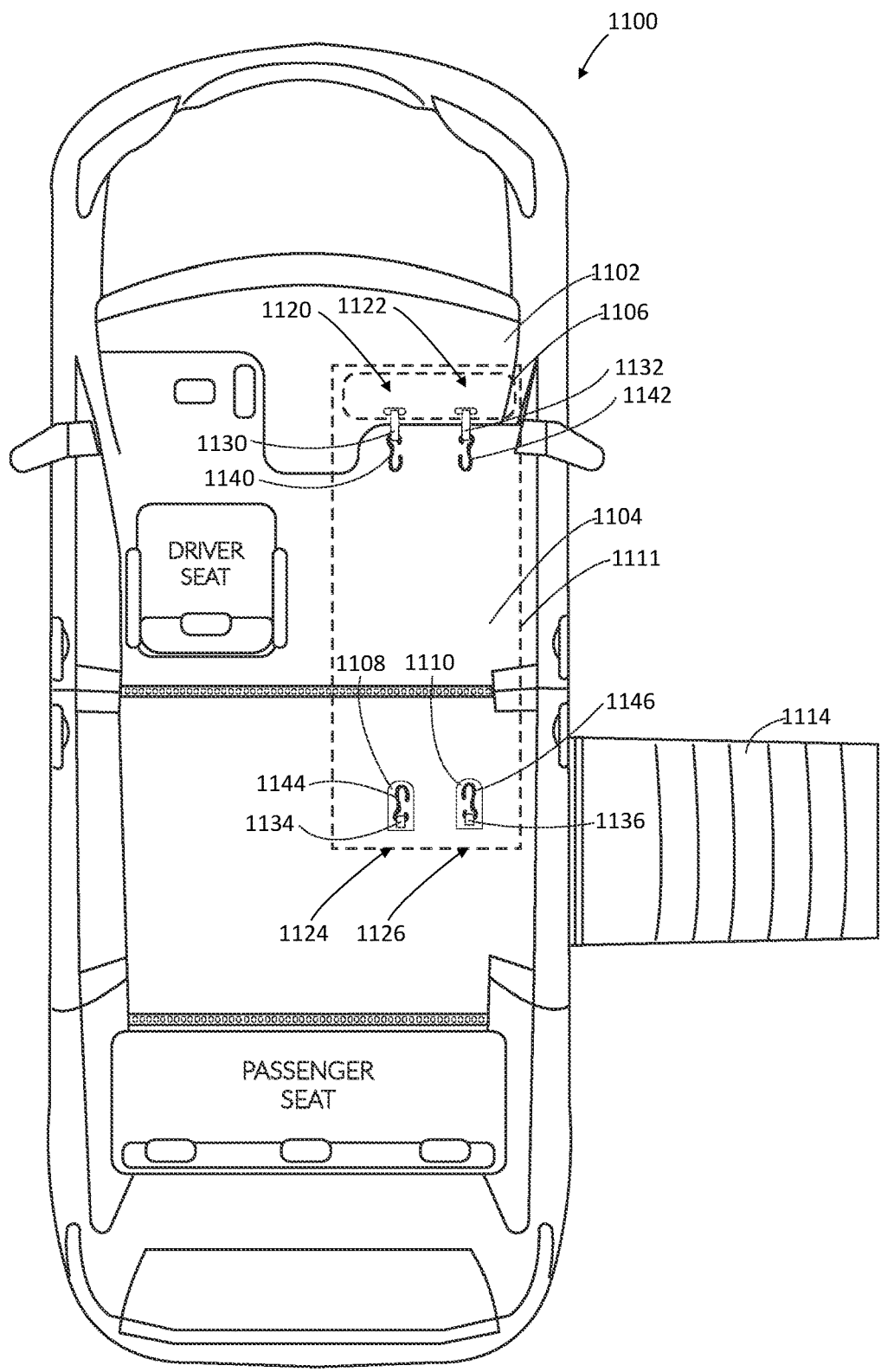
FIG. 4 is a schematic plan view of a first embodiment of a new side-entry wheelchair accessible van configured to secure a wheelchair in the front passenger wheelchair securement area and including front restraints integrated into the front passenger foot rest area and rear restraints integrated into the vehicle floor.
Figure 5:
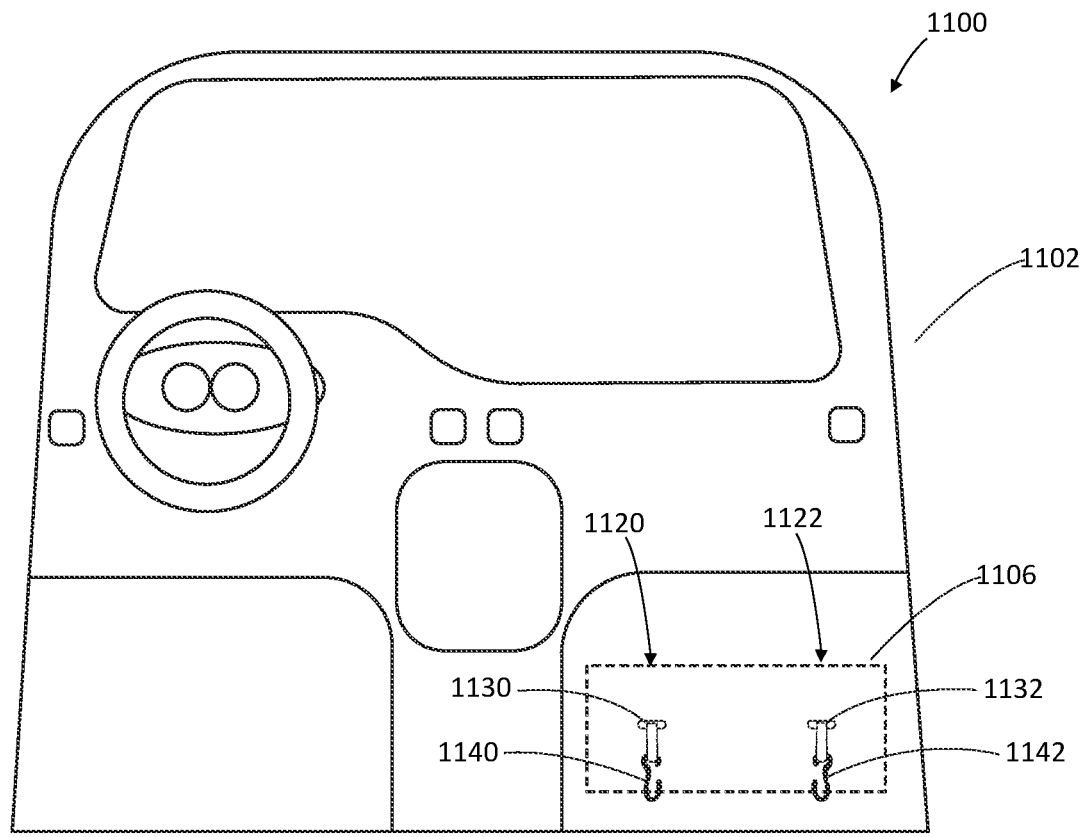
FIG. 5 is a schematic front view of the integrated front restraints for the first embodiment.
Figure 6:
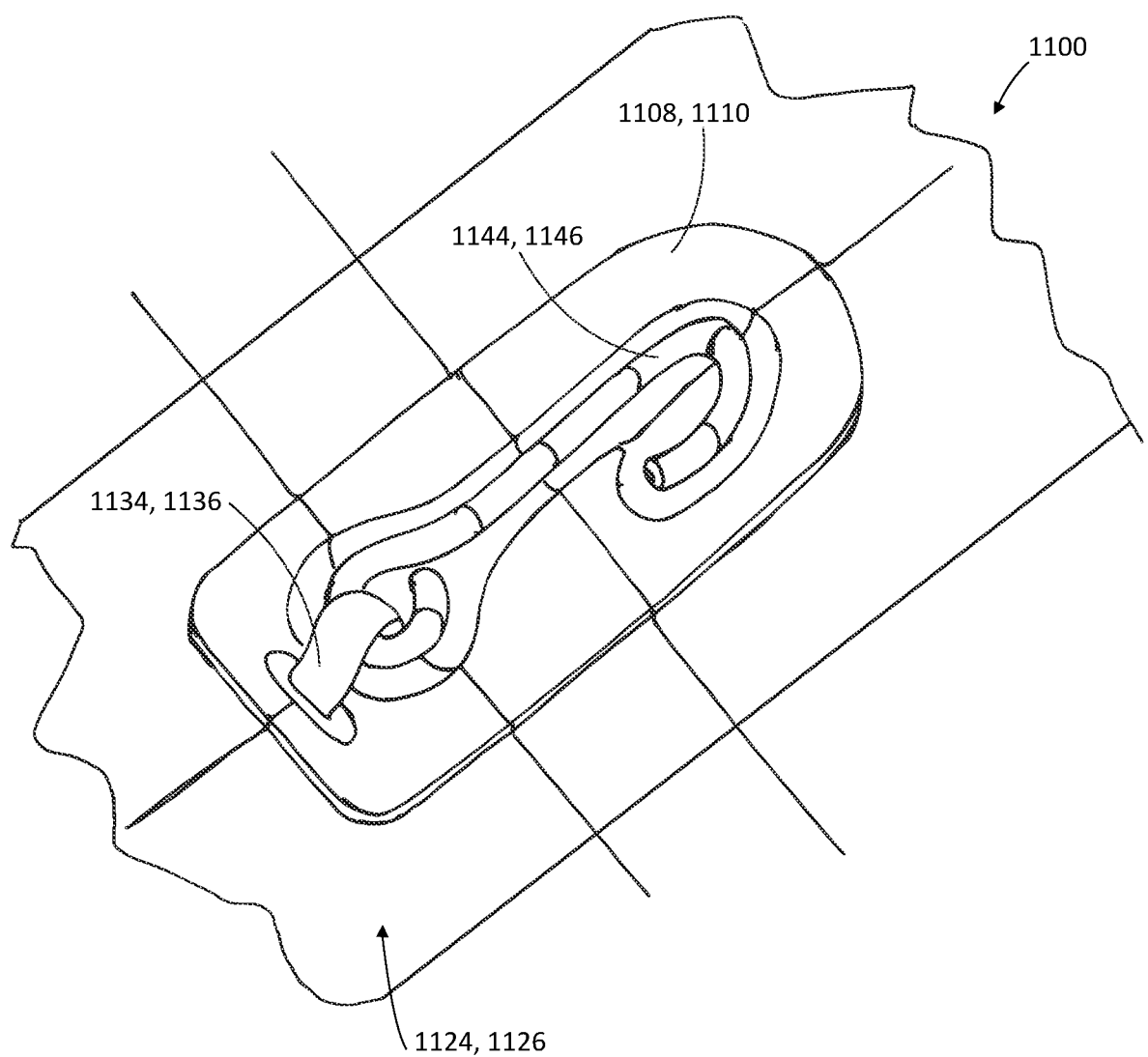
FIG. 6 is a schematic perspective view of the integrated rear restraints for the first embodiment.

In FIGS. 4-6, a first embodiment of a wheelchair accessible van 1100 configured to secure a wheelchair in the front passenger wheelchair securement area 1111 is shown. The van 1100 is provided with front restraints 1120, 1122 integrated at least partially into the front passenger foot rest area 1102 and rear restraints 1124, 1126 integrated into the vehicle floor 1104. Each of the front restraints 1120, 1122 and rear restraints 1124, 1126 may include a restraint retractor (not shown) that is remotely located.

The retractor for the front restraints 1120, 1122 may be located embedded in or at least partially behind the surface of the foot rest area 1102, either in front of or behind the vehicle firewall. Each retractor may include a strap 1130, 1132 (such as webbing, cable, wire, or similar) with a hook 1140, 1142 secured to the end of the strap 1130, 1132. The strap 1130, 1132 extends from the retractor spool (not shown) through one or more openings in the surface of the foot rest area 1102, whereby a user can grip the hook 1140, 1142 and secure it to the front of a wheelchair. Each of the front restraints 1120, 1122 may be secured within a separate housing located behind, flush, or nearly flush with the surface of the foot rest area 1102, or they may share a common housing 1106 as shown schematically. The housing 1106 or the surface of the foot rest area 1102 may be provided with depressions for receiving and/or holding (through friction or interference) the hooks 1140, 1142 behind, flush or nearly flush with the surface of the foot rest area 1102. In another embodiment, the front restraints 1120, 1122 and associated hardware may be located underneath the floor area 1104 at or near the intersection of the foot rest area 1102 and floor area 1104.

The retractor for the rear restraints 1124, 1126 may be located embedded in or at least partially below the surface of the floor area 1104, either above or below the underside of the vehicle floor frame, laterally adjacent to the side-entry ramp 1114 (rearward of its front edge and forward of the rear edge). Each retractor may include a strap 1134, 1136 (such as webbing, cable, wire, or similar) with a hook 1144, 1146 secured to the end of the strap 1134, 1136. The strap 1134, 1136 extends from the retractor spool (not shown) through one or more openings in the surface of the floor area 1104, whereby a user can grip the hook 1144, 1146 and secure it to the rear of a wheelchair. Each of the rear restraints 1124, 1126 may be secured within a separate housing 1108, 1110 located flush or nearly flush with the surface of the floor area 1104, as shown, or they may share a common housing. The housing 1108, 1110 may include depressions for receiving and/or holding (through friction or interference) the hooks 1144, 1146 under, flush or nearly flush with the surface of the floor area 1104. In that respect, a wheelchair may enter the via the ramp 1114 without the rear restraints 1124, 1126 obstructing the path into the wheelchair securement area 1111.

Figure 7:
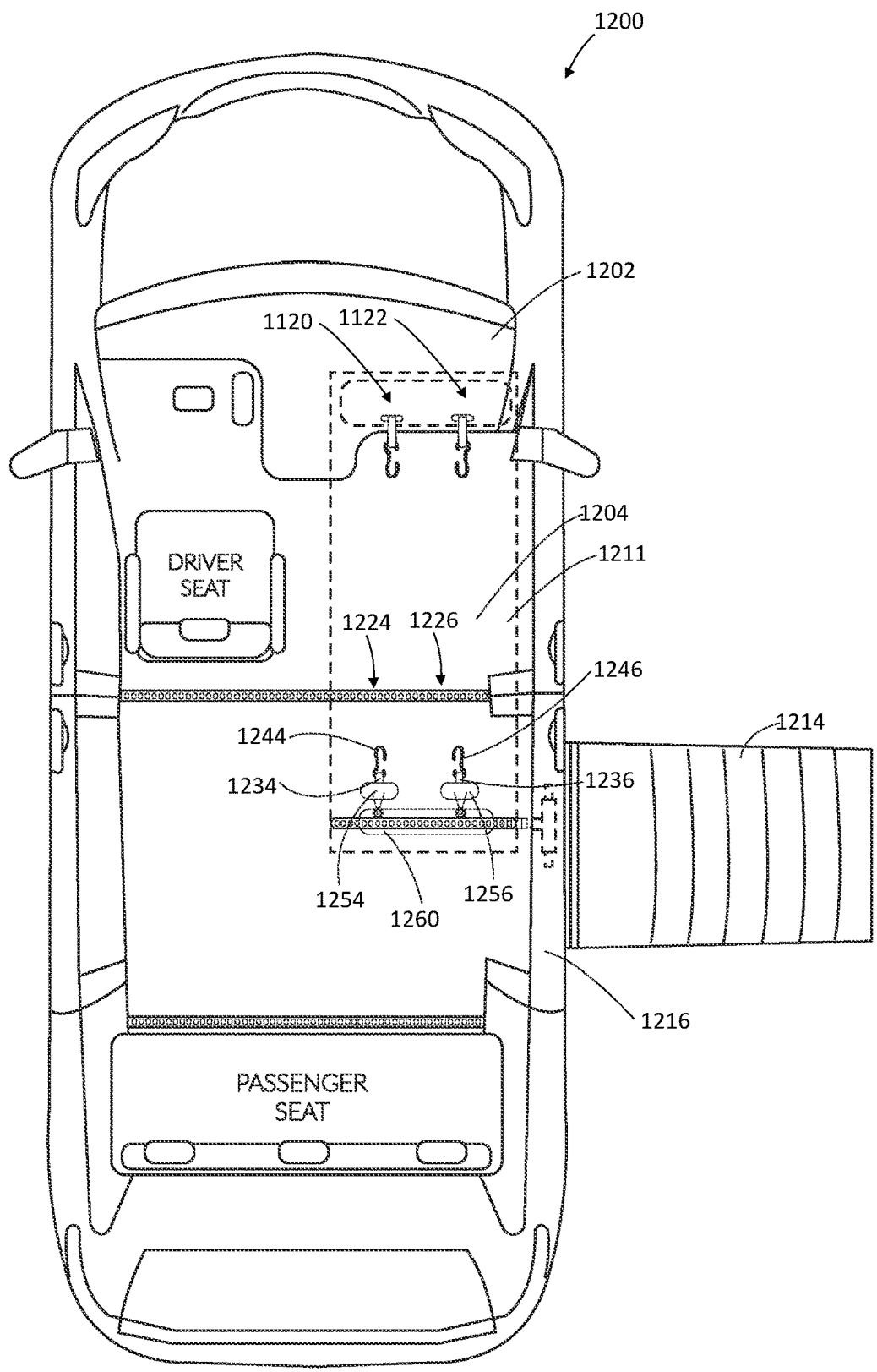
FIG. 7 a schematic plan view of a second embodiment of a new side-entry wheelchair accessible van configured to secure a wheelchair in the front passenger wheelchair securement area and including front restraints integrated into the front passenger foot rest area and rear restraints integrated into the sliding side-door.
Figure 8:
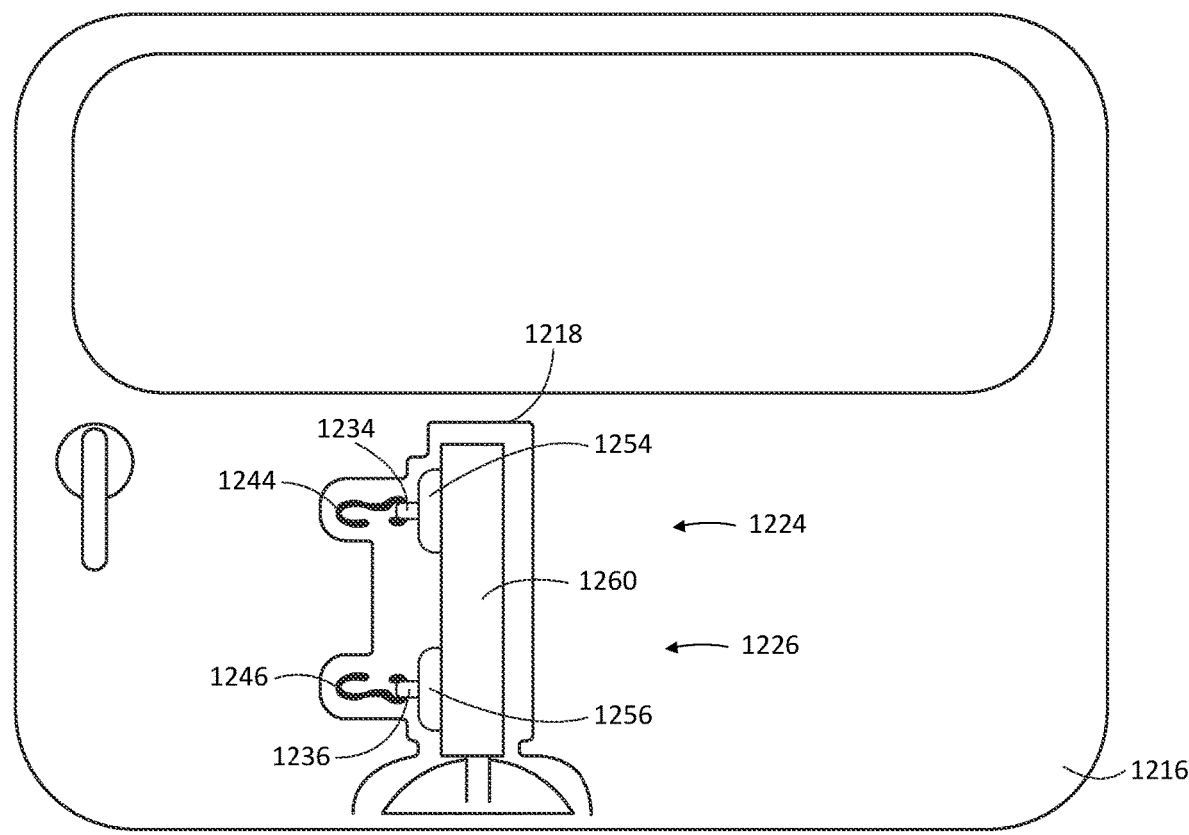
FIG. 8 is a schematic front view of the integrated rear restraints for the second embodiment.

Turning now to FIGS. 7-8, a second embodiment of a wheelchair accessible van 1200 configured to secure a wheelchair in the front passenger wheelchair securement area 1211 is shown. Like the van 1100 of the first embodiment, the van 1200 of the second embodiment is provided with front restraints 1220, 1222 integrated at least partially into the front passenger foot rest area 1202. The description of the front restraints 1120, 1122 for the first embodiment is applicable to the front restraints 1220, 1222 of the second embodiment. However, the rear restraints 1224, 1226 of the second embodiment differ from the first embodiment and are integrated into the vehicle side door 1216, which may be a sliding door. Each of the rear restraints 1224, 1226 may include a restraint retractor 1254, 1256, which may be mounted to a deployable support 1260, as shown schematically. The retractors 1254, 1256 may extend from (as shown) or be compactly housed within the deployable support 1260. Each retractor 1254, 1256 may include a strap 1234, 1236 (such as webbing, cable, wire, or similar) with a hook 1244, 1246 secured to the end of the strap 1234, 1236. The strap 1234, 1236 extends from the retractor spool (not shown) whereby a user can grip the hook 1244, 1246 and secure it to the rear of a wheelchair. Alternative embodiments are contemplated where the restraint retractor 1254, 1256 is mounted to the side door 1216 with the straps 1234, 1236 extending from the door 1216 along the length of the deployable support 1260 to a guide that redirects the straps 1234, 1236 toward the wheelchair. In such an alternative embodiment, only the straps 1234, 1236 and hooks 1244, 1246 will extend from the deployable support 1260.

The deployable support 1260 may pivotable between the deployed position shown in FIG. 7 and a stowed position shown in FIG. 8. Notably, with the support 1260 in the stowed position and with the door open, a wheelchair may enter the via the ramp 1214 without the rear restraints 1224, 1226 obstructing the path into the wheelchair securement area 1211. In alternative embodiments, with the door closed, the deployable support 1260 may be deployed via pivoting, telescoping, a combination of telescoping and pivoting, or other movements. More particularly, the support 1260 may be comprised of multiple telescoping members to position the rear restraints 1224, 1226 at different lateral positions in the vehicle 1200. In the deployed position, the support 1260 may extend laterally from the door region to the middle or near-middle of the vehicle 1200. The support 1260 may be pivotally connected directly to the door 1216, as shown, or may be pivotally connected to another structure adjacent to or in the region of the door 1216, such as the floor 1204. In the stowed position, the support 1260 may be positioned in a pocket 1218 in the door panel, where the support 1260 sits behind, flush, or nearly flush with the surface of the door panel.

In the deployed position, the support 1260 may engage with the floor via various types of connectors to strengthen the support 1260, which may otherwise be presented as a cantilever. The pocket 1218 in the door panel may hold (via friction or interference) the support 1260 in the stowed position. Alternatively, the pivotable connection may include locks for holding the support 1260 in one or both of the deployed and stowed positions. In addition, the door panel or the support 1260 itself may include additional pockets or other structures for receiving and holding (via friction or interference) the hooks 1244, 1246.

Figure 9:
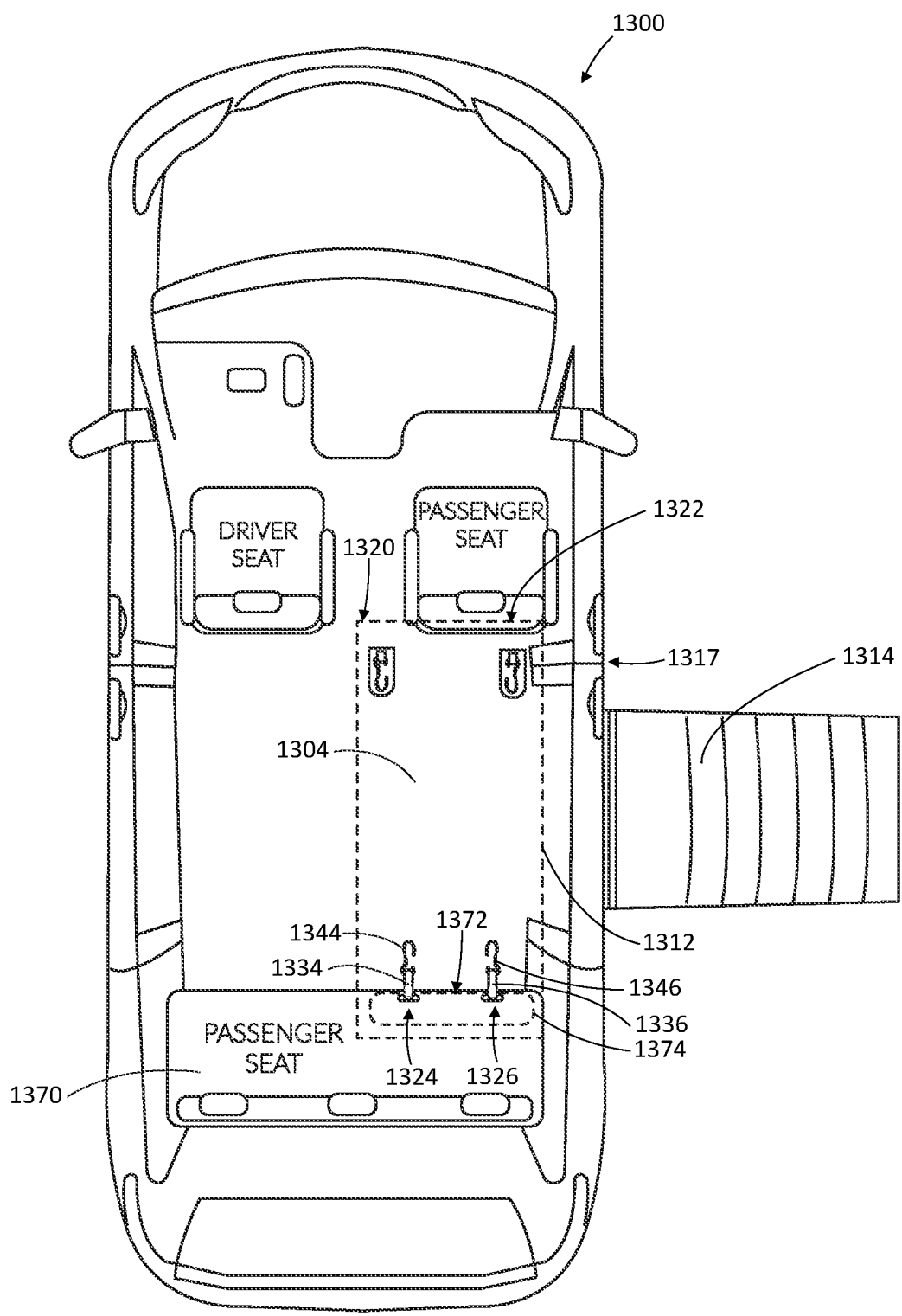
FIG. 9 is a schematic plan view of a third embodiment of a new side-entry wheelchair accessible van configured to secure a wheelchair in the mid-vehicle wheelchair securement area and including front restraints integrated in the vehicle floor and rear restraints integrated below the third row seat.
Figure 10:
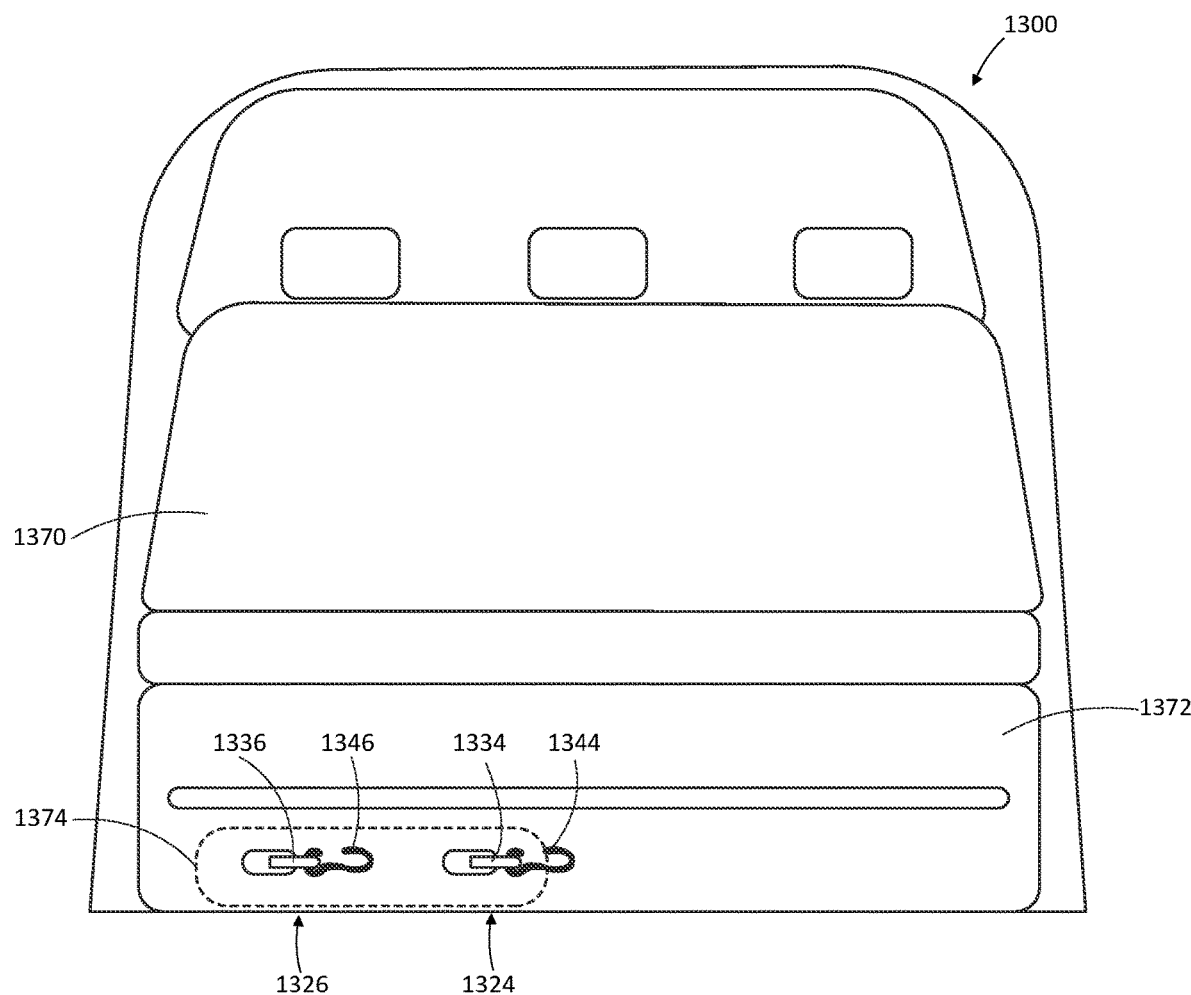
FIG. 10 is a schematic front view of the integrated rear restraints for the third embodiment.
Figure 11:
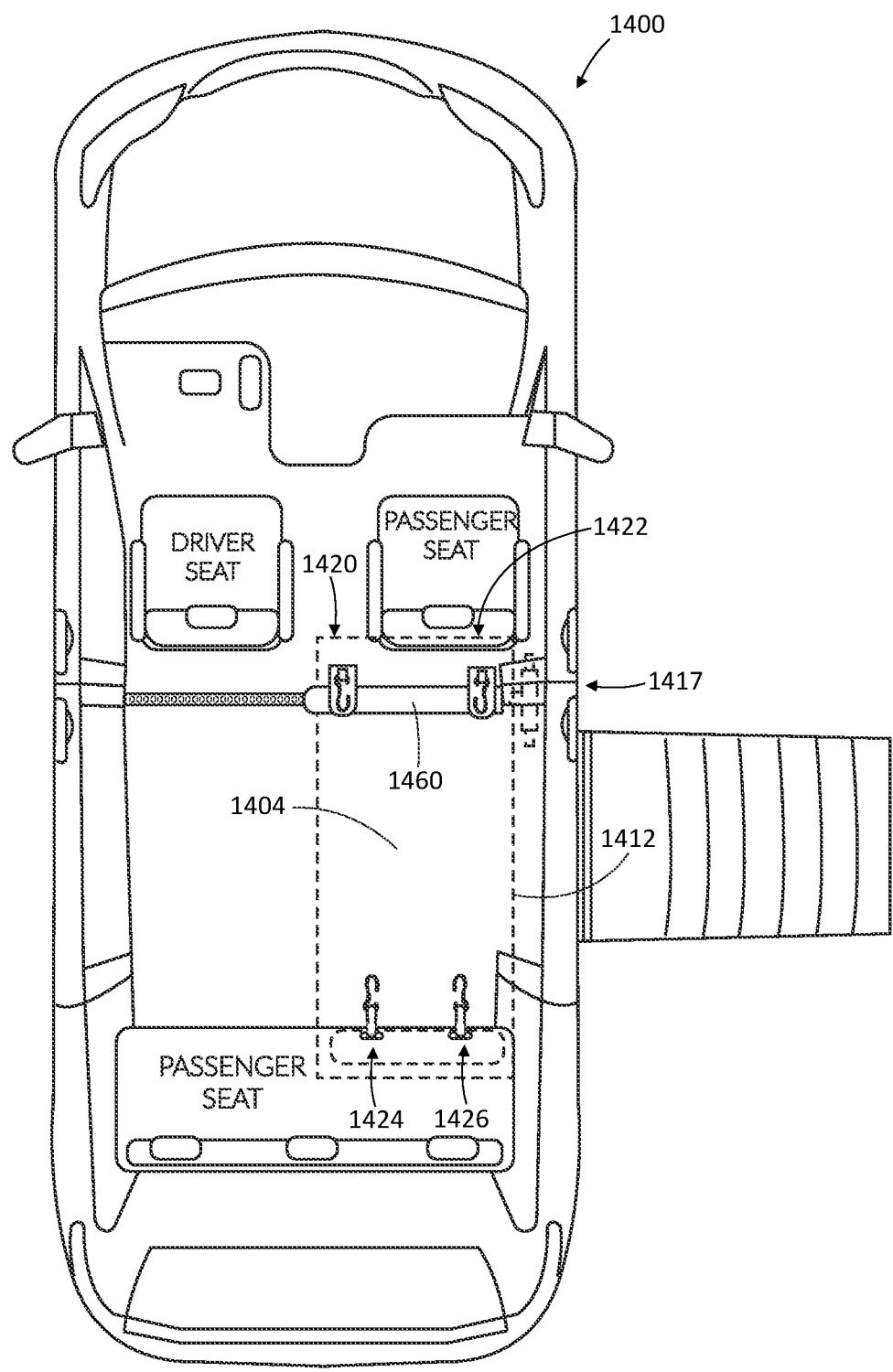
FIG. 11 is a schematic plan view of a fourth embodiment of a new side-entry wheelchair accessible van configured to secure a wheelchair in the mid-vehicle wheelchair securement area and including front restraints integrated in the vehicle B-pillar and rear restraints integrated below the third row seat.
Figure 12:
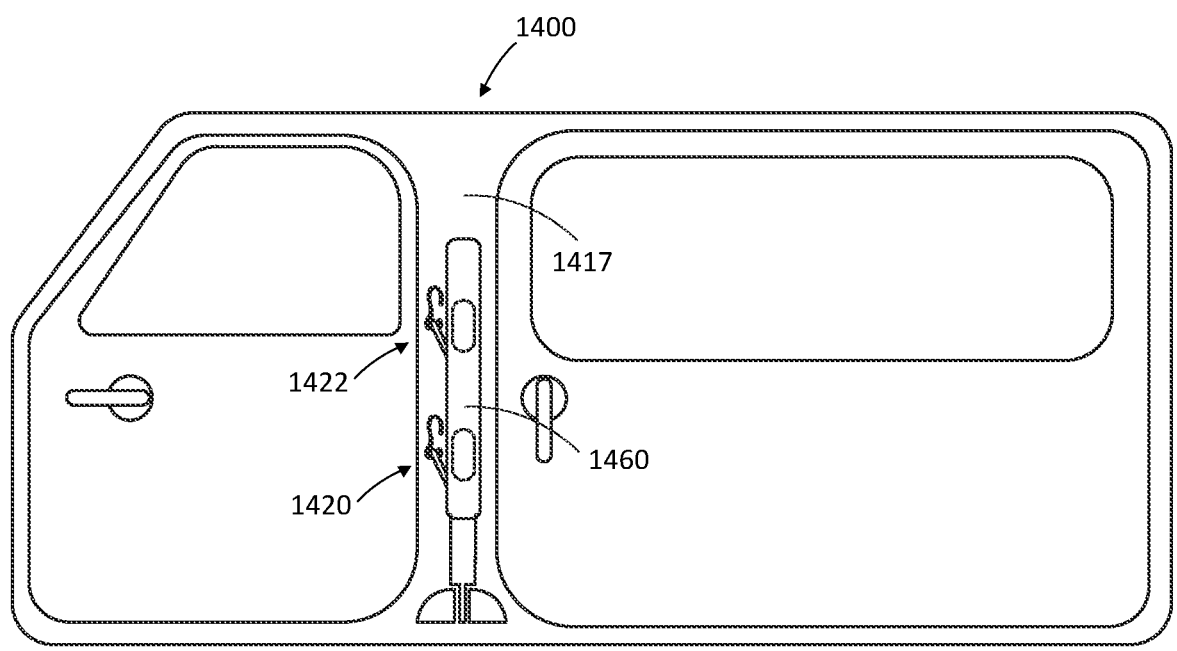
FIG. 12 is a schematic front view of the integrated front restraints of the fourth embodiment.

Turning now to FIGS. 9-10, a third embodiment of a wheelchair accessible van 1300 configured to secure a wheelchair in the mid-vehicle wheelchair securement area 1312 is shown. The van 1300 of the third embodiment is provided with front restraints 1320, 1322 integrated into the vehicle floor 1304. The front restraints 1320, 1322 may be essentially identical to the rear restraints 1124, 1126 of the first embodiment, except that the front restraints 1320, 1322 may be disposed laterally adjacent to the B-pillar 1317 of the vehicle 1300, rather than laterally adjacent the vehicle ramp 1114, and the front restraints 1320, 1322 may be turned 180° so that the hooks point rearward toward the wheelchair. Otherwise, the above description of the rear restraints 1124, 1126 applies for the front restraints 1320, 1322.

However, the rear restraints 1324, 1326 of the third embodiment differ from the other embodiments and are integrated into a portion of the rear passenger seat 1370. The retractor for the rear restraints 1324, 1326 may be located embedded in or at least partially behind the surface of the rear seat panel 1372. Each retractor may include a strap 1334, 1336 (such as webbing, cable, wire, or similar) with a hook 1344, 1346 secured to the end of the strap 1334, 1336. The strap 1334, 1336 extends from the retractor spool (not shown) through one or more openings in the surface of the rear seat panel 1372, whereby a user can grip the hook 1344, 1346 and secure it to the rear of a wheelchair. Each of the rear restraints 1324, 1326 may be secured within a separate housing located behind, flush, or nearly flush with the surface of the rear seat panel 1372, or they may share a common housing 1374 as shown schematically. The housing 1374 or the surface of the rear seat panel 1372 may be provided with depressions for receiving and/or holding (through friction or interference) the hooks 1344, 1346 behind, flush or nearly flush with the surface of the rear seat panel 1372. In another embodiment, the front restraints 1324, 1326 and associated hardware may be located underneath the floor area 1304 at or near the intersection of the rear seat panel 1372 and floor area 1304.

Turning now to FIGS. 9-10, a fourth embodiment of a wheelchair accessible van 1400 configured to secure a wheelchair in the mid-vehicle wheelchair securement area 1412 is shown. The van 1400 of the fourth embodiment is provided with front restraints 1420, 1422 integrated into the vehicle B-pillar 1417. The front restraints 1420, 1422 may be essentially identical to the rear restraints 1224, 1226 of the second embodiment, except that the deployable support 1460 may be pivotally connected directly to the B-pillar 1416, as shown, or may be pivotally connected to another structure adjacent to or in the region of the B-pillar 1416, such as the floor 1404, the retractors for the front restraints 1420, 1422 are integrated inside of the deployable support 1460, and the pockets for receiving and/or holding the support 1460 and hooks in the stowed position are located in the B-pillar 1416 panel. Otherwise, the above description of the rear restraints 1224, 1226 applies for the front restraints 1420, 1422. In addition, the van 1400 of the fourth embodiment is provided with rear restraints 1424, 1426 that are essentially identical to the rear restraints 1324, 1326 of the third embodiment. In that respect, the above description of the rear restraints 1324, 1326 applies for the rear restraints 1424, 1426.

Figure 3:
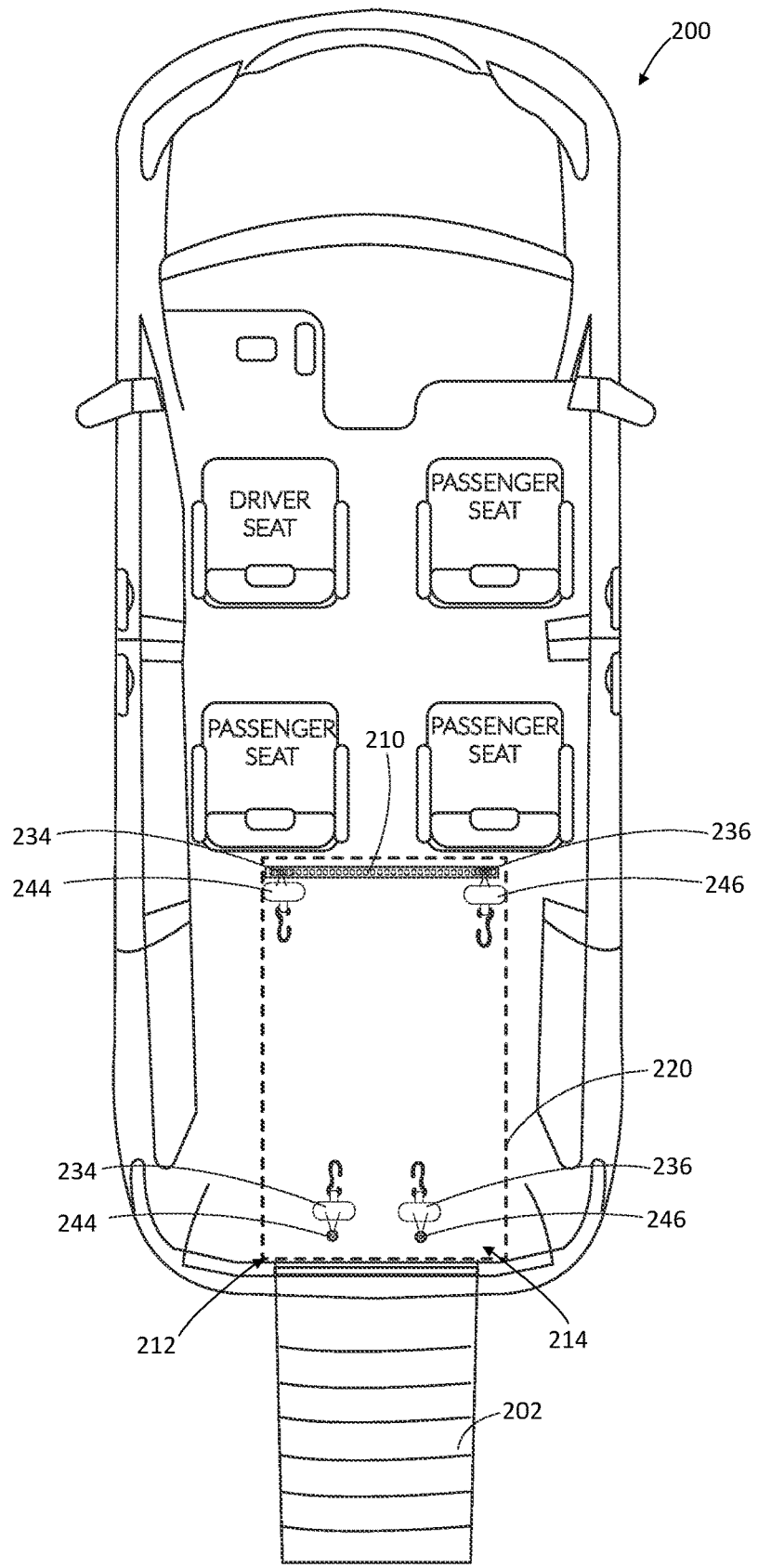
FIG. 3 is a schematic plan view of a prior art rear-entry wheelchair accessible van configured to secure a wheelchair in the rear wheelchair securement area.
Figure 13:
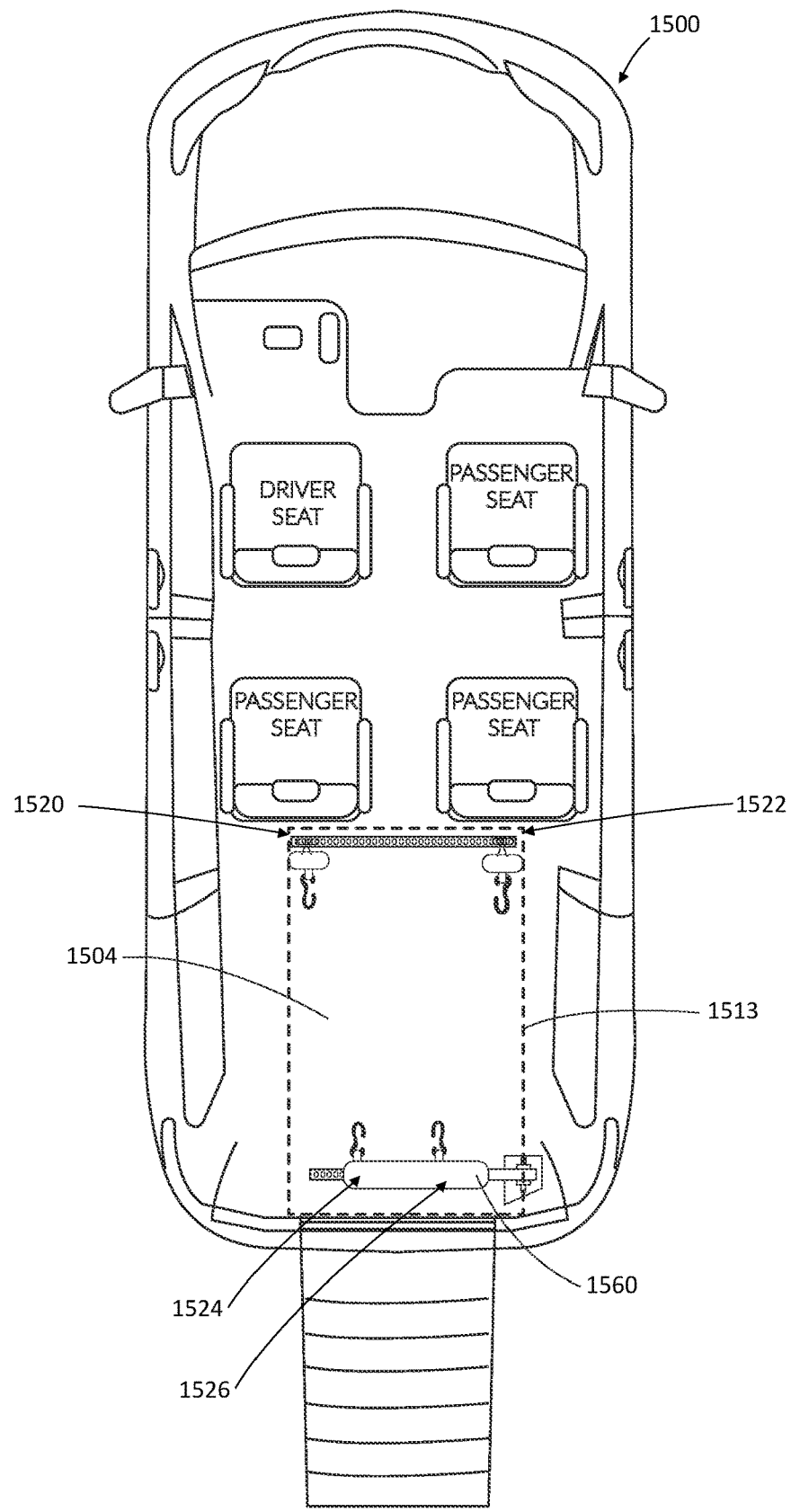
FIG. 13 is a schematic plan view of a fifth embodiment of a new rear-entry wheelchair accessible van configured to secure a wheelchair in the rear wheelchair securement area and including conventional front restraints and rear restraints integrated into the sidewalls of the wheelchair pan.

Turning now to FIG. 13, a fifth embodiment of a wheelchair accessible van 1500 configured to secure a wheelchair in the rear wheelchair securement area 1513 is shown. The front restraints 1520, 1522 may be conventional restraint retractors that are secured in an L-track, much like the front retractors 230, 232 of the prior art shown in FIG. 3. In an alternative embodiment, however, the front restraints 1520, 1522 may be identical to the front restraints of the third embodiment, except that the front restraints 1520, 1522 would be incorporated into the floor surface 1504 of the wheelchair pan. In yet another alternative embodiment, the front restraints 1520, 1522 may be incorporated into the sidewall of the wheelchair pan, the sidewall of the vehicle, or the C-pillar of the vehicle, much like the front restraints 1420, 1422 of the fourth embodiment are incorporated into the B-pillar 1417 and the rear restraints 1220, 1222 of the second embodiment are incorporated into the vehicle door 1216.

The van 1400 of the fourth embodiment is also provided with rear restraints 1524, 1526 integrated into the side wall 1519 of the wheelchair pan. The rear restraints 1524, 1526 may be essentially identical to the rear restraints 1224, 1226 of the second embodiment and/or the front restraint 1420, 1422 of the fourth embodiment, except that the deployable support 1560 may be pivotally connected directly to the side wall 1519 of the wheelchair pan, as shown, or may be pivotally connected to another structure adjacent to or in the region of the side wall 1519, such as the floor 1504 or the vehicle side wall, and the pockets for receiving and/or holding the support 1460 and hooks in the stowed position are located in the side wall 1519 of the wheelchair pan or the vehicle side wall panel. Otherwise, the above description of the rear restraints 1224, 1226 and front restraints 1420, 1422 applies for the rear restraints 1524, 1526. In an alternative embodiment, the rear restraints 1524, 1526 may be identical to the rear restraints 1124, 1126 of the first embodiment, except that the rear restraints 1524, 1526 would be incorporated into the floor surface 1504 of the wheelchair pan.

Figure 14:
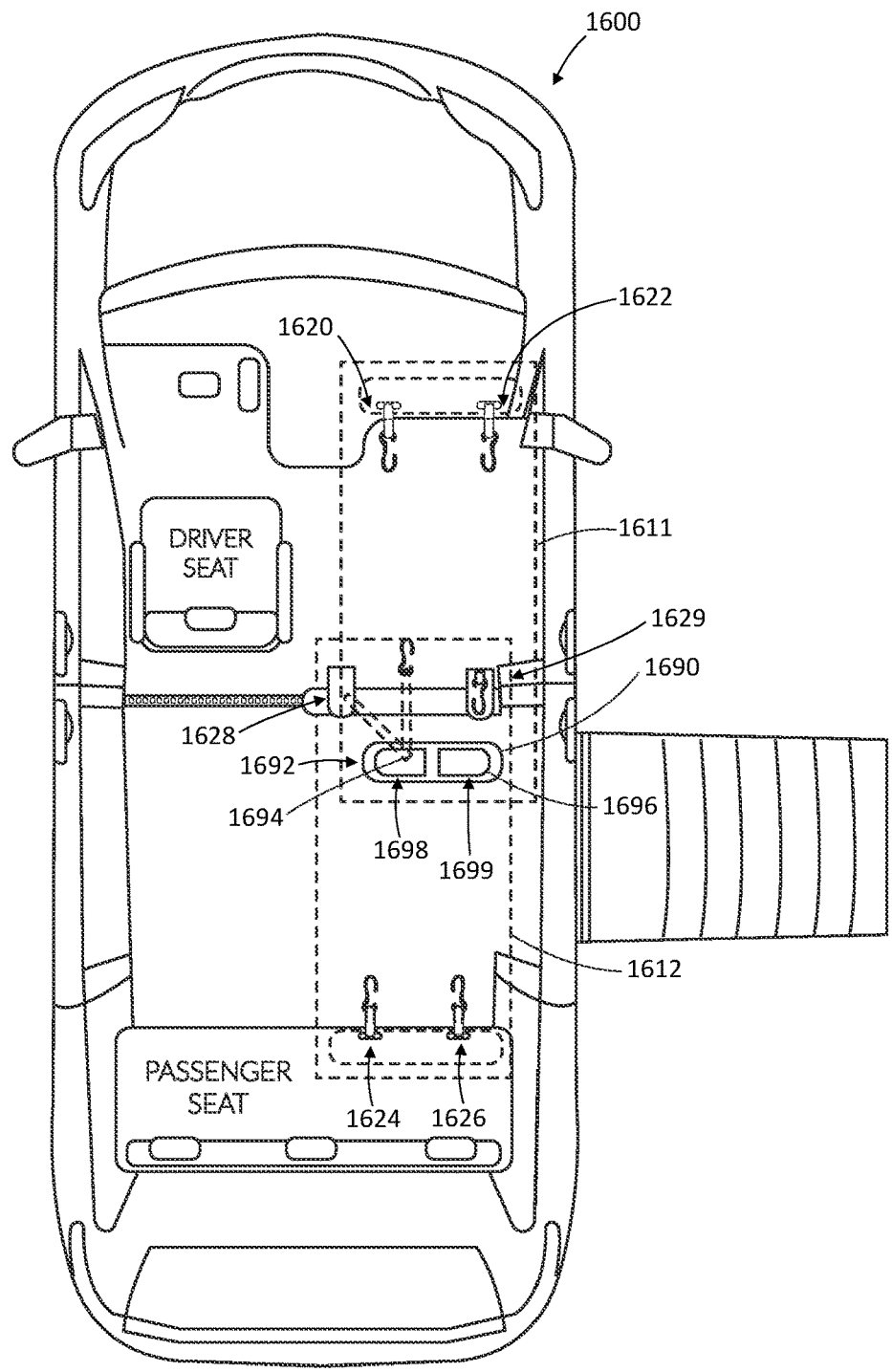
FIG. 14 is a schematic plan view of a sixth embodiment of a new side-entry wheelchair accessible van configured to secure a wheelchair in both the front passenger and the mid-vehicle wheelchair securement area and including front restraints integrated into the front passenger foot rest area, multi-use restraints integrated into the floor of the vehicle adjacent the B-pillar and forward of the ramp, guides integrated into the floor which allow the multi-use restraints to secure a wheelchair in the front-passenger wheelchair securement area, and rear restraints integrated below the third row seat.

Turning now to FIG. 14, a sixth embodiment of a wheelchair accessible van 1600 configured to secure a wheelchair in one of either a front passenger wheelchair securement area 1611 or a mid-vehicle wheelchair securement area 1612. Key to the sixth embodiment is at least one multi-use restraint that can be used in combination with at least one guide to alternatively to secure a wheelchair in the front wheelchair securement area 1611 and the mid-vehicle wheelchair securement area 1612. As shown, the van 1600 includes two multi-use restraints 1628, 1629 that are essentially identical to the front restraints 1320, 1322 of the third embodiment. In that regard, the above description for the front restraints 1320, 1322 is applicable for the multi-use restraints 1628, 1629 as relates to securement of a wheelchair in the mid-vehicle wheelchair securement area 1612.

The multi-use restraints 1628, 1629, as shown, are configured to be secured directly to the front of the wheelchair when located in the mid-vehicle wheelchair securement area 1612, or indirectly to the rear of the wheelchair when located in the front passenger wheelchair securement area 1611, through a pair of guides 1698, 1699 (as shown in dashed line for the left multi-use restraint 1628). Each of the guides 1698, 1699 may be pivotably attached directly to the floor surface 1604, or pivotably attached to a separate housing located underneath, flush, or nearly flush with the floor surface 1604, or they may share a common housing 1690 as shown schematically. In that regard, the guides 1698, 1699 do not obstruct the wheelchair from maneuvering inside of the vehicle. The guides 1698, 1699 may be pivotable about axis 1692, and may include openings 1694, 1696 for receiving the strap of restraints 1628, 1629 therein. Alternatively, the guides 1698, 1699 may be sized to receive the hook and strap of restraints 1628, 1629 therethrough.

In alternative embodiments, the multi-use restraints may take other forms, including restraints that are integrated into the B-Pillar, vehicle door, or other structures. In which case, multiple guides would be located for each restraint, one in a position appropriate to secure the wheelchair from the rear when located in the front wheelchair securement area 1611 (i.e., positioned rearward of the front edge of the wheelchair ramp and forward of the rear edge of the wheelchair ramp) and the other in a position appropriate to secure the wheelchair from the front when located in the mid-vehicle wheelchair securement area 1612 (i.e., positioned adjacent the B-pillar).

The sixth embodiment may also include one or more front restraints 1620, 1622 for securing the front of the wheelchair when located in the front passenger wheelchair securement area 1611 and one or more rear restraints 1624, 1626 for securing the rear of the wheelchair when located in the mid-vehicle wheelchair securement area 1612. The front restraints 1620, 1622 and rear restraints 1624, 1626 may take any form described herein or otherwise already known in the art. As shown, the front restraints 1620, 1622 are essentially identical to the front restraints 1120, 1122 of the first embodiment, while the rear restraints 1624, 1626 are essentially identical to the rear restraints 1324, 1326 of the third embodiment.

In alternative embodiments, the multi-use restraint (with or without one or more guides) of the sixth embodiment may be used to alternatively secure a wheelchair in one of two different wheelchair securement areas that may be adjacent to each other, including, but not limited to: a mid-vehicle securement area and a rear securement area; a left mid-vehicle securement area and a right mid-vehicle securement area.

Figure 15:
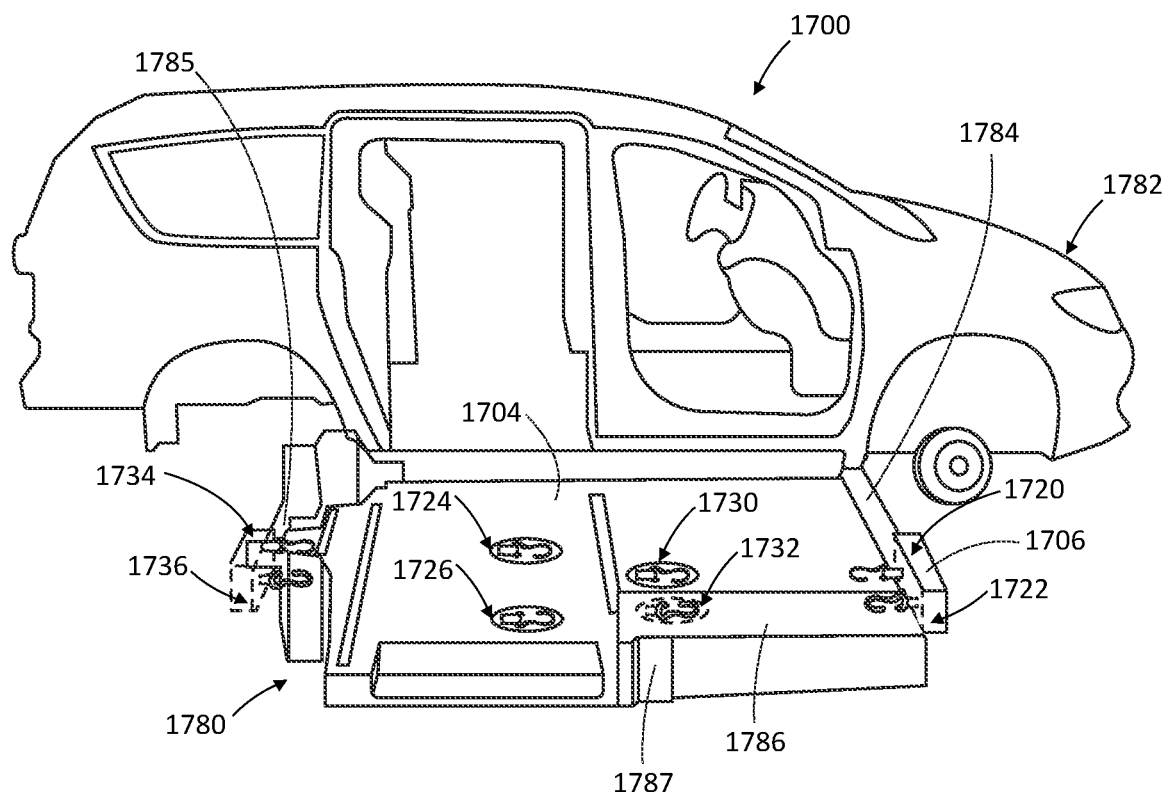
FIG. 15 is a perspective view of a seventh embodiment of a new side-entry wheelchair accessible van configured to secure a wheelchair in both a front passenger and a mid-vehicle wheelchair securement areas, wherein the wheelchair restraint system takes the form of the wheelchair securement systems of the first and third embodiments and is incorporated into the new floor frame prior to connection to the vehicle body.

Turning now to FIG. 15, a seventh embodiment of a wheelchair accessible van 1700 is shown after the OEM floor has been cut out and prior to installation of the new vehicle floor 1780 onto the vehicle body 1782. Notably, the new vehicle floor 1780 comprises the vehicle floor 1704 bordered at the front by a sloped front wall 1784, at the rear by a sloped rear wall 1785, and at the sides by a sloped side wall 1786 that includes a B-pillar portion 1787. The seventh embodiment includes one or more restraints that are integrated with the new vehicle floor 1780 prior to attachment to the vehicle body. As an example, the seventh embodiment may include one or more of the following integrated restraints: front-front (i.e., front restraints for the front wheelchair securement area) restraints 1720, 1722 rear-front restraint 1724, 1726, front-rear restraints 1730, 1732, and rear-rear restraints 1734, 1736.

The front-front restraints 1720, 1722 may take the form of the front restraints 1120, 1122 of the first embodiment, as shown. The housing 1706 for the front restraints 1720, 1722 may be secured to the forward side of the sloped front wall 1784 or, in alternative embodiments may be secured either to the rearward side of the sloped front wall 1784, the top or bottom of the floor 1704, or, more generally, at or near the intersection of the floor 1704 and the sloped front wall 1784.

The rear-front and front-rear restraints 1724, 1726, 1730, 1732 may take the form of the rear restraints 1124, 1126 of the first embodiment and front restraints 1320, 1322 of the third embodiment, as shown. The rear-front and front-rear restraints 1724, 1726, 1730, 1732 may be secured underneath or on top of the floor 1704, so that they may be flush or nearly flush with the finished floor surface of the vehicle.

The rear-rear restraints 1734, 1736 may take the form of the rear restraints 1324, 1326 of the third embodiment, as shown. The housing 1774 for the rear-rear restraints 1734, 1736 may be secured to the rearward side of the sloped rear wall 1785 or, in alternative embodiments may be secured either to the forward side of the sloped rear wall 1785, the top or bottom of the floor 1704, or, more generally, at or near the intersection of the floor 1704 and the sloped rear wall 1785.

Figure 16:
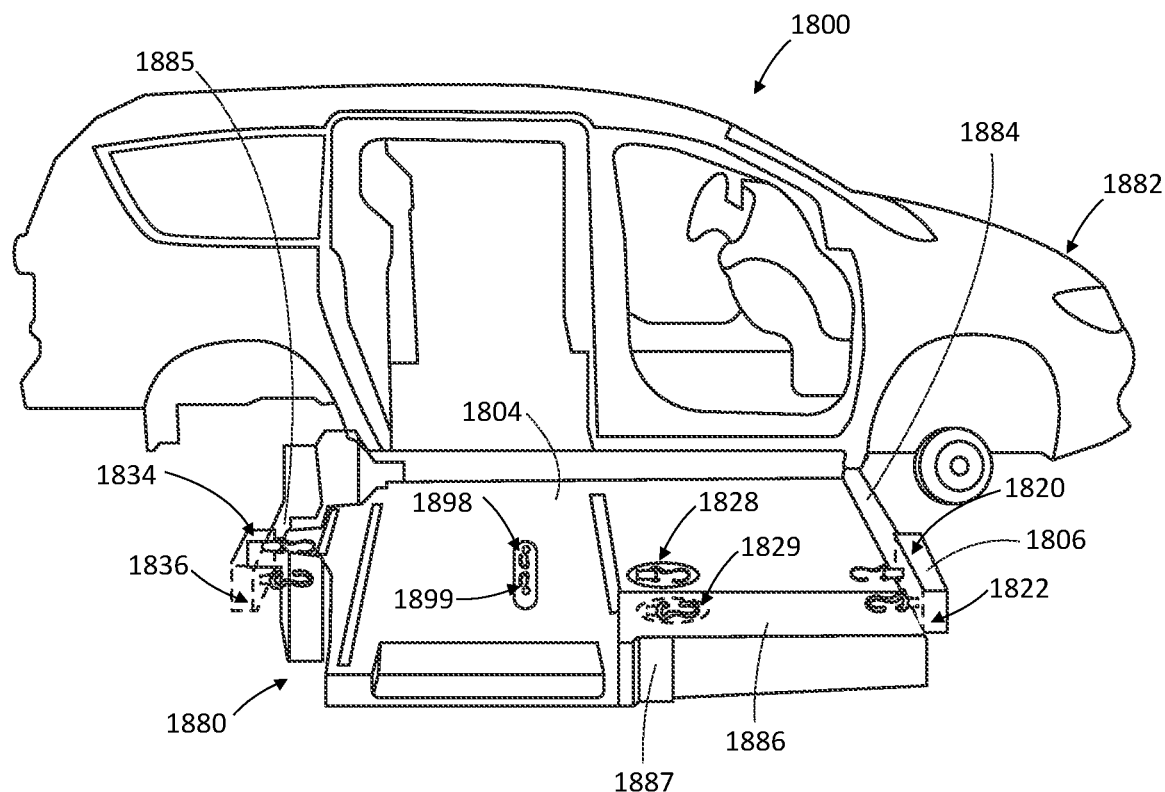
FIG. 16 is a perspective view of a eighth embodiment of a new side-entry wheelchair accessible van configured to secure a wheelchair in both a front passenger and a mid-vehicle wheelchair securement areas, wherein the wheelchair restraint system takes the form of the wheelchair securement systems of the second and fourth embodiments and is incorporated into the new floor frame prior to connection to the vehicle body.

Turning now to FIG. 16, an eighth embodiment of a wheelchair accessible van 1800 is shown after the OEM floor has been cut out and prior to installation of the new vehicle floor 1880 onto the vehicle body 1882. Notably, the new vehicle floor 1880 comprises the vehicle floor 1804 bordered at the front by a sloped front wall 1884, at the rear by a sloped rear wall 1885, and at the sides by a sloped side wall 1886 that includes a B-pillar portion 1887. The seventh embodiment includes one or more restraints that are integrated with the new vehicle floor 1880 prior to attachment to the vehicle body. As an example, the seventh embodiment may include one or more of the following integrated restraints: front-front (i.e., front restraints for the front wheelchair securement area) restraints 1820, 1822, multi-use restraints 1828, 1829, and rear-rear restraints 1834, 1836.

The front-front restraints 1820, 1822 may take the form of the front restraints 1120, 1122 of the first embodiment, as shown. The housing 1806 for the front restraints 1820, 1822 may be secured to the forward side of the sloped front wall 1884 or, in alternative embodiments may be secured either to the rearward side of the sloped front wall 1884, the top or bottom of the floor 1804, or, more generally, at or near the intersection of the floor 1804 and the sloped front wall 1884.

The multi-use restraints 1828, 1829 may be used in combination with the guides 1898, 1899, which all take the form of the multi-use restraints 1628, 1629 and guides 1698, 1699 of the sixth embodiment, as shown. The multi-use restraints 1828, 1829 and guides 1898, 1899 may be secured underneath or on top of the floor 1804, so long as they may be flush or nearly flush with the finished floor surface of the vehicle.

The rear-rear restraints 1834, 1836 may take the form of the rear restraints 1324, 1326 of the third embodiment, as shown. The housing 1874 for the rear-rear restraints 1834, 1836 may be secured to the rearward side of the sloped rear wall 1885 or, in alternative embodiments may be secured either to the forward side of the sloped rear wall 1885, the top or bottom of the floor 1804, or, more generally, at or near the intersection of the floor 1804 and the sloped rear wall 1885.

Figure 17:
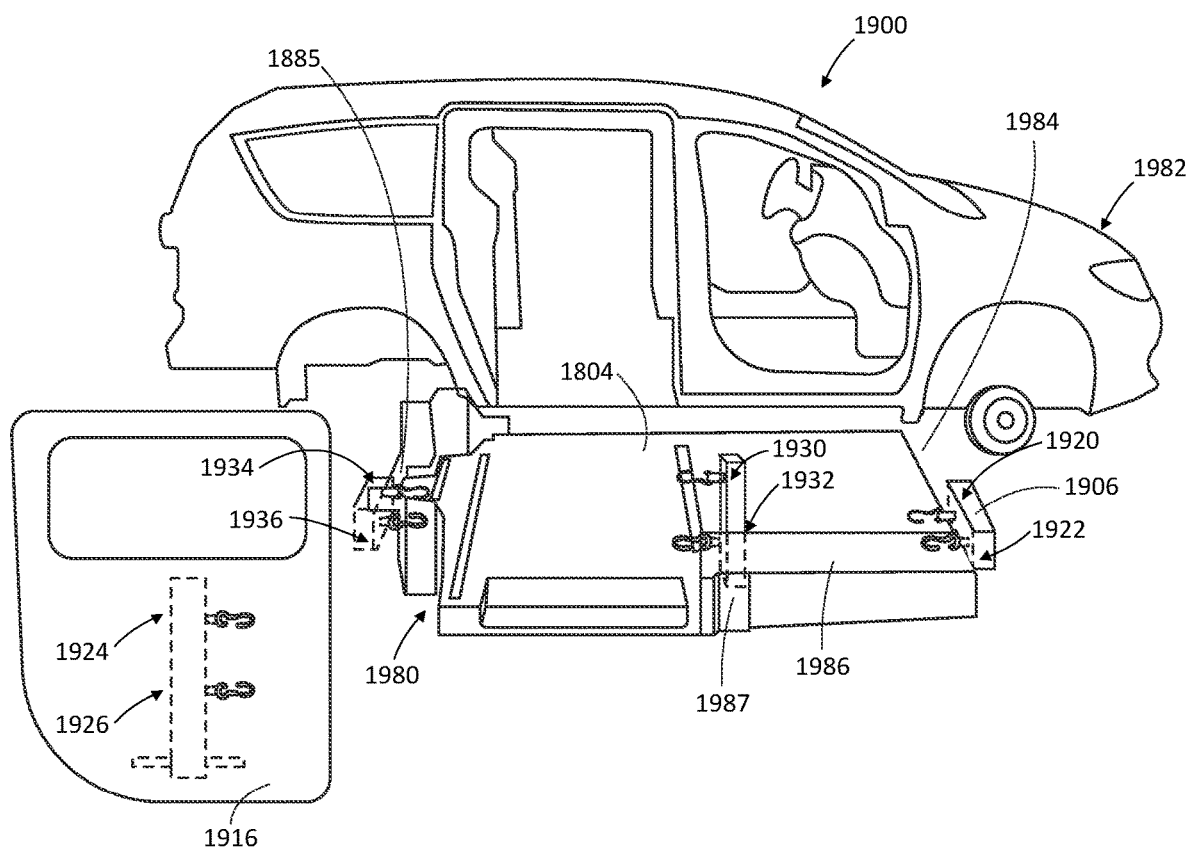
FIG. 17 is a perspective view of a ninth embodiment of a new side-entry wheelchair accessible van configured to secure a wheelchair in both a front passenger and a mid-vehicle wheelchair securement areas, wherein the wheelchair restraint system takes the form of the wheelchair securement system of the seventh embodiments and is incorporated into the new floor frame prior to connection to the vehicle body; and, FIG. 18 is a schematic plan view of the tenth embodiment of a new side-entry wheelchair accessible van configured to secure a wheelchair in both a front passenger and a mid-vehicle wheelchair securement areas, wherein the wheelchair restraint system comprises less than four tie-downs in combination with one or more stationary or moveable bumpers.

Turning now to FIG. 17, a ninth embodiment of a wheelchair accessible van 1900 is shown after the OEM floor has been cut out and prior to installation of the new vehicle floor 1980 onto the vehicle body 1982. Notably, the new vehicle floor 1980 comprises the vehicle floor 1904 bordered at the front by a sloped front wall 1984, at the rear by a sloped rear wall 1985, and at the sides by a sloped side wall 1986 that includes a B-pillar portion 1987. The seventh embodiment includes one or more restraints that are integrated with the new vehicle floor 1980 prior to attachment to the vehicle body. As an example, the seventh embodiment may include one or more of the following integrated restraints: front-front (i.e., front restraints for the front wheelchair securement area) restraints 1920, 1922 rear-front restraint 1924, 1926, front-rear restraints 1930, 1932, and rear-rear restraints 1934, 1936.

The front-front restraints 1920, 1922 may take the form of the front restraints 1120, 1122 of the first embodiment, as shown. The housing 1906 for the front restraints 1920, 1922 may be secured to the forward side of the sloped front wall 1984 or, in alternative embodiments may be secured either to the rearward side of the sloped front wall 1984, the top or bottom of the floor 1904, or, more generally, at or near the intersection of the floor 1904 and the sloped front wall 1984.

The rear-front and front-rear restraints 1924, 1926, 1930, 1932 may take the form of the rear restraints 1224, 1226 of the second embodiment and front restraints 1420, 1422 of the fourth embodiment, as shown. In that respect, the rear-front restraints 1924, 1926 may be secured to the door 1916. The front-rear restraints 1930, 1932 may be secured on the left side, the right side, or internally to the B-pillar region 1987 of sloped side wall 1986. Alternatively, the front-rear restraints 1930, 1932 may be secured to the floor 1904 near the B-pillar region 1987 of the sloped side wall 1986.

The rear-rear restraints 1934, 1936 may take the form of the rear restraints 1324, 1326 of the third embodiment, as shown. The housing 1974 for the rear-rear restraints 1934, 1936 may be secured to the rearward side of the sloped rear wall 1985 or, in alternative embodiments may be secured either to the forward side of the sloped rear wall 1985, the top or bottom of the floor 1904, or, more generally, at or near the intersection of the floor 1904 and the sloped rear wall 1985.

Figure 18:
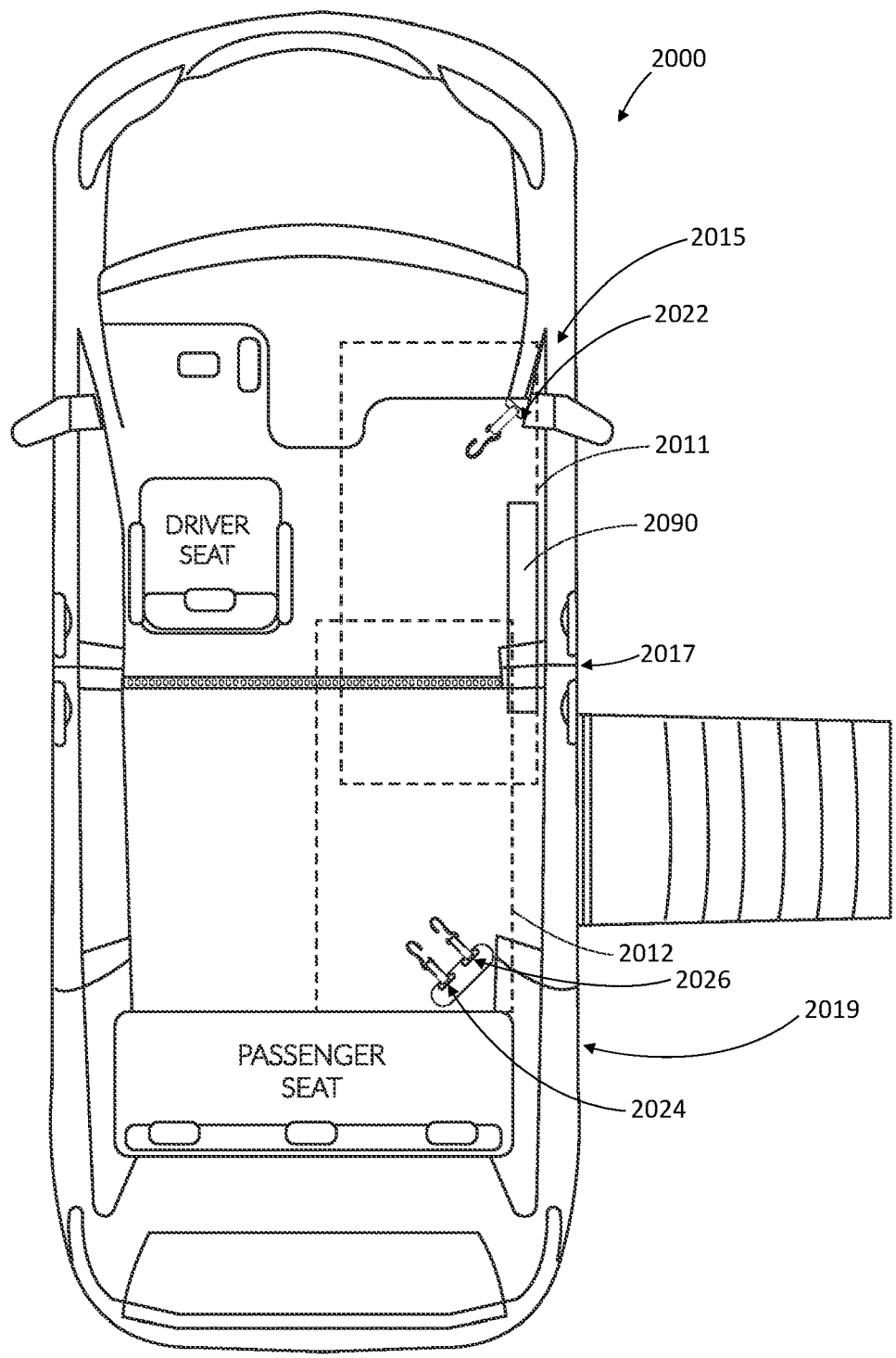

Turning now to FIG. 18, a tenth embodiment of a wheelchair accessible van 2000 configured to secure a wheelchair in one of either a front passenger wheelchair securement area 2011 or a mid-vehicle wheelchair securement area 2012. Key to the tenth embodiment is the inclusion of at least one bumper 2090 that eliminates the need for a four-point tie-down to secure the wheelchair during transit. Three (as shown), two, or even only one tie-downs 2022, 2024, 2026 may be used in combination with the one or more bumpers 2090 to secure a wheelchair, including in the configurations shown in U.S. Pat. No. 9,107,786, issued on Aug. 12, 2015, and U.S. Pat. No. 10,285,879, issued on May 14, 2019. The tie-downs 2022, 2024, 2026 and bumpers 2090 may be "multi-use," as shown, in that they can be used for multiple securement areas (e.g., both the front passenger and mid-vehicle securement areas 2011, 2012), or dedicated tie-downs and bumpers can be provided for each securement area. In addition, while a single bumper 2090 is shown secured to the B-pillar 2017, any number of bumpers secured at any location in the vehicle may be employed.

The bumper 2090 may be stationary or may be movable. In one embodiment, the bumper 2090 may be moveable between one or more use positions and one or more non-use positions. For example, the bumper 2090 may be pivotally attached to the vehicle about a horizontal axis 2092, and can be adapted to pivot between a forward position (as shown) for use when securing the wheelchair in the front passenger wheelchair securement area 2011, an up position (roughly 90° from forward position) for storage when not in use, and a rearward position (roughly 180° from forward position) for use when securing the wheelchair in the mid-vehicle wheelchair securement area 2012. In another embodiment, the bumper 2090 may be moveable between a non-secured position and a wheelchair secured position. In the non-secured position, there may be a space or gap between the bumper 2090 and the wheelchair. In the wheelchair secured position, the bumper 2090 may have moved toward a structure of the wheelchair (e.g., a side surface) to at least partially close a space or gap between the wheelchair and the bumper 2090 and/or may have exerted a force on a structure of the wheelchair. The bumper 2090 may be configured to actually move the wheelchair and induce tension in the tie-downs 2022, 2024, 2026. In yet other embodiments, the bumper 2090 may be moveable between one or more use positions and one or more non-secured positions, and also moveable between a non-contact position and a wheelchair secured position.

As shown, the van 2000 includes a single front multi-use tie-down 2022 that may be positioned in the front right corner of the front passenger securement area 2011. The tie-down 2022 may be secure to the vehicle adjacent, on, or in the A-pillar 2015. The tie-down 2022 may be used to secure the front right corner of the wheelchair in both the front passenger securement area 2011 and the mid-vehicle securement area 2012. Alternatively, a second tie-down may be provided for the mid-vehicle securement area 2012, perhaps adjacent, on, or in the B-pillar 2017 of the vehicle.

As shown, the van 2000 includes two rear multi-use tie-downs 2024, 2026 that may be positioned in the rear right corner of the mid-vehicle passenger securement area 2012. The tie-downs 2024, 2026 may be secured to the vehicle adjacent, one, or in the C-pillar 2019. In alternative embodiments, the rear restraints may take the form and location of any other rear tie-downs described herein or otherwise known in the art. The tie down 2024 may be used to secure the rear left corner of the wheelchair while the tie down 2026 may be used to secure the rear right corner of the wheelchair, in both the front passenger securement area 2011 and the mid-vehicle securement area 2012. Alternatively, a second set of tie-downs may be provided for the front passenger securement area 2011, perhaps adjacent, on, or in the B-pillar 2017 or side sliding door of the vehicle. In one alternative embodiment, the two rear tie-downs 2024, 2026 may be replaced with a single, sufficiently robust tie-down that may be secured to the rear right corner of the wheelchair.

Ideally, the orientation and geometry of the tie-downs relative to the bumper will naturally improve the securement of the wheelchair. For example, as shown, inducing tension in the tie-downs 2022, 2024, 2026 will urge the wheelchair toward the bumper 2090 and, similarly, if the bumper 2090 was moveable to close the gap between the bumper 2090 and the wheelchair, moving the bumper to the wheelchair secured position would induce pretension in the tie-downs 2022, 2024, 2026.

Although the foregoing embodiments all depict two front restraints and two rear restraints for a given wheelchair securement area, other embodiments are contemplated that include more or less than two restraints at the front and rear, respectively.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A floor frame adapted for securement to a main body of a vehicle, wherein:
   the floor frame has a floor portion, an upstanding front portion, and an upstanding rear portion;
   the floor frame is at least partially configured to secure a wheelchair in a first wheelchair securement area that is positioned forward of a second wheelchair securement area;
   the floor frame is configured to receive a wheelchair through at least one of a side door and a rear door;
   the floor frame comprises an integrated wheelchair securement system comprising:
   at least one front tie-down for securing a front of the wheelchair in the first wheelchair securement area, the at least one front tie-down having a housing and a restraint, the housing being secured to the upstanding front portion,
   at least one rear tie-down for securing a rear of the wheelchair in the first wheelchair securement area, the at least one rear tie-down having a housing and a restraint, the housing being secured to the floor portion at a rear of the first wheelchair securement area;
   at least one front tie-down for securing the front of the wheelchair in the second wheelchair securement area, the at least one front tie-down having a housing and a restraint, the housing being secured to to the floor portion at a front of the second wheelchair securement area;
   at least one rear tie-down for securing the rear of the wheelchair in the second wheelchair securement area, the at least one rear tie-down having a housing and a restraint, the housing being secured to the upstanding rear portion or to the floor portion near the upstanding rear portion.

2. The floor frame of claim 1, wherein:
   the at least one front tie-down for securing the front of the wheelchair in the first wheelchair securement area comprises a first front tie-down and a second front tie-down, the at least one rear tie-down for securing the rear of the wheelchair in the first wheelchair securement area comprises a first rear tie-down and a second rear tie-down, the at least one front tie-down for securing the front of the wheelchair in the second wheelchair securement area comprises a third front tie-down and a fourth front tie-down, and the at least one rear tie-down for securing the rear of the wheelchair in the second wheelchair securement area comprises a third rear tie-down and a fourth rear tie-down.

3. The floor frame of claim 1, wherein:

the floor frame is configured to receive the wheelchair through the side door;

a side-entry ramp is located adjacent the side door between the upstanding front portion and the upstanding rear portion, is disposed under a floor surface in a stowed position, and provides a pathway to the floor surface in a deployed position; and, the at least one front tie-down for securing the front of the wheelchair in the first wheelchair securement area being disposed forward of the side-entry ramp and the at least one rear tie-down for securing the rear of the wheelchair in the second wheelchair securement area being disposed rearward of the side-entry ramp.

4. The floor frame of claim 1, wherein:

a rear vehicle seat module is located at a rear side of the second wheelchair securement area and includes a rear-seat panel that faces forward and extends between the floor portion and a seat bottom of the rear vehicle seat module; and, the restraint of the at least one rear tie-down for securing the rear of the wheelchair in the second wheelchair securement area extends from the rear-seat panel of the vehicle.

5. The floor frame of claim 2, down system, wherein:

the floor frame is configured to receive the wheelchair through the side door;

a side-entry ramp is located adjacent the side door between the upstanding front portion and the upstanding rear portion, is disposed under a floor surface in a stowed position, and provides a pathway to the floor surface in a deployed position; and, the at least one front tie-down for securing the front of the wheelchair in the first wheelchair securement area being disposed forward of the side-entry ramp and the at least one rear tie-down for securing the rear of the wheelchair in the second wheelchair securement area being disposed rearward of the side-entry ramp.

6. The floor frame of claim 5, wherein:

a rear vehicle seat module is located at a rear side of the second wheelchair securement area and includes a rear-seat panel that faces forward and extends between the floor portion and a seat bottom of the rear vehicle seat module; and, the restraint of the at least one rear tie-down for securing the rear of the wheelchair in the second wheelchair securement area extends from the rear-seat panel of the vehicle.

7. The floor frame of claim 1, wherein the the housing of the at least one rear tie-down for securing the rear of the wheelchair in the first wheelchair securement area is positioned rearward of the housing of the at least one front tie-down for securing the front of the wheelchair in the second wheelchair securement area.

8. The floor frame of claim 1 being adapted for securement to but not including a main body of the vehicle.

9. The floor frame of claim 1 being secured to a main body of the vehicle.

10. An integrated wheelchair tie-down system for a vehicle, wherein:

the vehicle includes a floor frame defining a first wheelchair securement area that is positioned forward of a second wheelchair securement area;

the floor frame has a floor portion, an upstanding front portion, and an upstanding rear portion;

the vehicle is configured to receive a wheelchair through at least one of a side door and a rear door; and, the integrated wheelchair tie-down system comprises:

at least one front tie-down for securing a front of the wheelchair in the first wheelchair securement area, the at least one front tie-down including a housing and a restraint, the housing being configured for securement to the upstanding front portion;

at least one rear tie-down for securing a rear of the wheelchair in the first wheelchair securement area, the at least one rear tie-down including a housing and a restraint, the housing being configured for securement to the floor portion at a rear of the first wheelchair securement area;

at least one front tie-down for securing the front of the wheelchair in the second wheelchair securement area, the at least one front tie-down including a housing and a restraint, the housing being configured for securement to the floor portion at a front of the second wheelchair securement area;

at least one rear tie-down for securing the rear of the wheelchair in the second wheelchair securement area, the at least one rear tie-down including a housing and a restraint, the housing being configured for securement to the upstanding rear portion or to the floor portion near the upstanding rear portion.

11. The integrated wheelchair tie-down system of claim 10, wherein;

the at least one front tie-down for securing the front of the wheelchair in the first wheelchair securement area comprises a first front tie-down and a second front tie-down, the at least one rear tie-down for securing the rear of the wheelchair in the first wheelchair securement area comprises a first rear tie-down and a second rear tie-down, the at least one front tie-down for securing the front of the wheelchair in the second wheelchair securement area comprises a third front tie-down and a fourth front tie-down, and the at least one rear tie-down for securing the rear of the wheelchair in the second wheelchair securement area comprises a third rear tie-down and a fourth rear tie-down.

12. The integrated wheelchair tie-down system of claim 10 in the vehicle, wherein;

the floor frame is configured to receive the wheelchair through the side door;

a side-entry ramp is located adjacent the side door between the upstanding front portion and the upstanding rear portion, is disposed under a floor surface in a stowed position, and provides a pathway to the floor surface in a deployed position; and, the at least one front tie-down for securing the front of the wheelchair in the first wheelchair securement area being disposed forward of the side-entry ramp and the at least one rear tie-down for securing the rear of the wheelchair in the second wheelchair securement area being disposed rearward of the side-entry ramp.

13. The integrated wheelchair tie-down system of claim 10 in the vehicle, wherein:
a rear vehicle seat module is located at a rear side of the second wheelchair securement area and includes a rear-seat panel that faces forward and extends between the floor portion and a seat bottom of the rear vehicle seat module;
the restraint of the at least one rear tie-down for securing the rear of the wheelchair in the second wheelchair securement area extends from the rear-seat panel of the vehicle.

14. The integrated wheelchair tie-down system of claim 11 in the vehicle, wherein:
the floor frame is configured to receive the wheelchair through the side door;
a side-entry ramp is located adjacent the side door between the upstanding front portion and the upstanding rear portion, is disposed under a floor surface in a stowed position, and provides a pathway to the floor surface in a deployed position; and,
the at least one front tie-down for securing the front of the wheelchair in the first wheelchair securement area being disposed forward of the side-entry ramp and the at least one rear tie-down for securing the rear of the wheelchair in the second wheelchair securement area being disposed rearward of the side-entry ramp.

15. The integrated wheelchair tie-down system of claim 14, wherein:
a rear vehicle seat module is located at a rear side of the second wheelchair securement area and includes a rear-seat panel that faces forward and extends between the floor portion and a seat bottom of the rear vehicle seat module;
the restraint of the at least one rear tie-down for securing the rear of the wheelchair in the second wheelchair securement area extends from the rear-seat panel of the vehicle.

16. The integrated wheelchair tie-down system of claim 10 in the vehicle, wherein the housing of the at least one rear tie-down for securing the rear of the wheelchair in the first wheelchair securement area is positioned rearward of the housing of the at least one front tie-down for securing the front of the wheelchair in the second wheelchair securement area.

17. A vehicle comprising:
a floor frame defining a first wheelchair securement area that is positioned forward of a second wheelchair securement area;
the floor frame has a floor portion, an upstanding front portion, and an upstanding rear portion;
the vehicle is configured to receive a wheelchair through at least one of a side door and a rear door; and,
an integrated wheelchair tie-down system comprises:
at least one front tie-down for securing a front of the wheelchair in the first wheelchair securement area, the at least one front tie-down including a housing and a restraint, the housing being secured to the upstanding front portion;
at least one rear tie-down for securing a rear of the wheelchair in the first wheelchair securement area, the at least one rear tie-down including a housing and a restraint, the housing being secured to the floor portion at a rear of the first wheelchair securement area;
at least one front tie-down for securing the front of the wheelchair in the second wheelchair securement area, the at least one front tie-down including a housing and a restraint, the housing being secured to the floor portion at a front of the second wheelchair securement area;
at least one rear tie-down for securing the rear of the wheelchair in the second wheelchair securement area, the at least one rear tie-down including a housing and a restraint, the housing being secured to the upstanding rear portion or to the floor portion near the upstanding rear portion.

18. The vehicle of claim 17, wherein:
the at least one front tie-down for securing the front of the wheelchair in the first wheelchair securement area comprises a first front tie-down and a second front tie-down,
the at least one rear tie-down for securing the rear of the wheelchair in the first wheelchair securement area comprises a first rear tie-down and a second rear tie-down,
the at least one front tie-down for securing the front of the wheelchair in the second wheelchair securement area comprises a third front tie-down and a fourth front tie-down, and
the at least one rear tie-down for securing the rear of the wheelchair in the second wheelchair securement area comprises a third rear tie-down and a fourth rear tie-down.

19. The vehicle of claim 18, wherein:
the floor frame is configured to receive the wheelchair through the side door;
a side-entry ramp is located adjacent the side door between the upstanding front portion and the upstanding rear portion, is disposed under a floor surface in a stowed position, and provides a pathway to the floor surface in a deployed position; and,
the at least one front tie-down for securing the front of the wheelchair in the first wheelchair securement area being disposed forward of the side-entry ramp and the at least one rear tie-down for securing the rear of the wheelchair in the second wheelchair securement area being disposed rearward of the side-entry ramp.

20. The vehicle of claim 19, wherein:
a rear vehicle seat module is located at a rear side of the second wheelchair securement area and includes a rear-seat panel that faces forward and extends between the floor portion and a seat bottom of the rear vehicle seat module;
the restraint of the at least one rear tie-down for securing the rear of the wheelchair in the second wheelchair securement area extends from the rear-seat panel of the vehicle.

* * * * *